(12) United States Patent
Sahlin et al.

(10) Patent No.: US 7,153,792 B2
(45) Date of Patent: Dec. 26, 2006

(54) FLEXIBLE COMPOSITES AND APPLICATIONS INCLUDING THE FLEXIBLE COMPOSITES

(75) Inventors: Katherine M. Sahlin, Medford, MA (US); Michael P. Cushman, Williamstown, MA (US)

(73) Assignee: Saint-Gobain Performance Plastics Corporation, Wayne, NJ (US)

( * ) Notice: Subject to any disclaimer, the term of this patent is extended or adjusted under 35 U.S.C. 154(b) by 0 days.

(21) Appl. No.: 10/834,787

(22) Filed: Apr. 29, 2004

(65) Prior Publication Data

US 2004/0219851 A1    Nov. 4, 2004

Related U.S. Application Data

(60) Provisional application No. 60/466,762, filed on Apr. 30, 2003.

(51) Int. Cl.
B32B 5/26    (2006.01)
(52) U.S. Cl. ............... 442/246; 442/203; 442/204; 442/208; 442/218; 442/239; 442/250; 442/251; 442/254; 442/255
(58) Field of Classification Search ........... 442/203, 442/204, 208, 218, 239, 246, 251, 254, 255, 442/250
See application file for complete search history.

(56) References Cited

U.S. PATENT DOCUMENTS

| 3,132,671 | A | * | 5/1964 | Koppelman et al. ........... 139/11 |
| 4,432,744 | A | | 2/1984 | Imamura et al. |
| 4,610,918 | A | | 9/1986 | Effenberger et al. |
| 4,615,933 | A | | 10/1986 | Traut |
| 4,764,427 | A | * | 8/1988 | Hara et al. ................ 428/400 |
| 4,770,927 | A | | 9/1988 | Effenberger et al. |
| 4,825,912 | A | * | 5/1989 | Fleury et al. ............... 139/305 |
| 4,887,656 | A | * | 12/1989 | Verbauwhede et al. ..... 152/531 |
| 5,110,681 | A | * | 5/1992 | Satake et al. ............... 428/419 |
| 5,323,170 | A | * | 6/1994 | Lang .......................... 343/872 |
| 5,368,923 | A | | 11/1994 | Tippett |
| 5,380,477 | A | * | 1/1995 | Kent et al. .................. 264/103 |
| 5,394,906 | A | | 3/1995 | Farley |
| 5,401,901 | A | * | 3/1995 | Gerry et al. ........... 174/35 MS |
| 5,617,902 | A | | 4/1997 | Farley |
| 5,637,375 | A | * | 6/1997 | Hohman ..................... 428/113 |
| 5,822,038 | A | | 10/1998 | Slater et al. |
| 5,899,241 | A | | 5/1999 | David et al. |

(Continued)

FOREIGN PATENT DOCUMENTS

EP    0 967 071 A1    12/1999

(Continued)

OTHER PUBLICATIONS

Dictionary definition of "flexible" The American Heritage® Dictionary of the English Language, Fourth Edition Copyright © 2004, 2000 by Houghton Mifflin Company. (no month).*

(Continued)

*Primary Examiner*—Andrew T. Piziali
(74) *Attorney, Agent, or Firm*—Foley & Lardner LLP

(57) ABSTRACT

A flexible composite includes a ply having a non-orthogonal orientation. The flexible composite may be a component of a flexible assembly. The flexible assembly may be any number of fabric-based assemblies such as a radome cover of a radome, a belt for an industrial machine, an expansion joint to connect ducts of a factory, and/or a roof or skylight of a structure (notably permanent structures). The ply may be individually stabilized by a stabilizing agent such as a matrix material. The ply may be woven and may include warp yarns and fill yarns.

43 Claims, 8 Drawing Sheets

U.S. PATENT DOCUMENTS

| | | | |
|---|---|---|---|
| 5,939,341 A | | 8/1999 | Brown et al. |
| 6,004,891 A | * | 12/1999 | Tuppin et al. ............... 442/208 |
| 6,107,976 A | * | 8/2000 | Purinton ..................... 343/872 |
| 6,164,339 A | | 12/2000 | Greenhalgh |
| 6,192,944 B1 | | 2/2001 | Greenhalgh |
| 6,230,376 B1 | | 5/2001 | Dischler et al. |
| 6,251,994 B1 | * | 6/2001 | Wang et al. ................ 525/127 |
| 6,280,818 B1 | | 8/2001 | Smith et al. |
| 6,294,488 B1 | | 9/2001 | Tippett |
| 6,306,781 B1 | | 10/2001 | McGrath |
| 6,323,825 B1 | * | 11/2001 | Zidek et al. ................ 343/872 |
| 6,458,724 B1 | | 10/2002 | Veiga et al. |
| 6,791,510 B1 | * | 9/2004 | Watanabe et al. ........... 343/897 |

FOREIGN PATENT DOCUMENTS

| | | |
|---|---|---|
| EP | 1 167 814 A1 | 1/2002 |
| GB | 1 382 535 | 5/1972 |
| JP | WO0236429 A1 * | 5/2002 |
| WO | WO 92/09429 A1 | 6/1992 |

OTHER PUBLICATIONS

Practical Display of Complaints Analysis by TES, Quality Info Exhibition, printed from web site http://textileinfo.com on Mar. 6, 2003, copyright 1999-2003, Senshoku Keizal Shimbun, 4 pages.

Mugunthan, S. et al., Article 2: Management of Fiber Optic Circuits, printed from web site http://216.239.33.100 on Mar. 6, 2003, 10 pages.

USPTO Patent Full-Text and Image Database, Results of Search in 1976 to present db for: ((SPEC/skew AND SPEC/fabric) AND SPEC/orthogonal), hits 1-30 out of 30, 2 pages, (no date).

USPTO Patent Full-Text and Image Database, Results of Search in 1996-2002 db for: woven AND non-orthogonal, hits 1-23 out of 23, 2 pages, (no date).

USPTO Patent Full-Text and Image Database, Results of Search in 1996-2002 db for: coated AND skew, hits 1-842 out of 842, 37 pages, (no date).

SIVAM Project Amazon Area Brazil EEC Contracts with AFC for Radomes for Weather Radar, printed from web site http://www.radome.net on Mar. 10, 2003, copyright 2002 Antennas for Communications, 3 pages.

US Air Force Awards AFC Contract for the Ground Terminal Radome for the Predator Unmanned Reconnaissance Aircraft, printed from web site http://www.radome.net on Mar. 10, 2003, copyright 2002 Antennas for Communications, 3 pages.

Dielectric Radomes, Maximum Protection Minimum Transmission Loss, printed from web site http://www.radome.com on Mar. 10, 2003, copyright 1997-2001 Antennas for Communications, 7 pages.

RAYDEL® Q65 Microwave Transmissive Composite, Jun. 24, 2003, 2 pages.

Technical Specifications: High Strength Architectural Membrane, printed from web site http://www.rubb.com on Jan. 3, 2004, copyright 2003 by Rubb International A/S, 7 pages.

Architectural Membrane, printed from web site http://www.sprung.com on Jan. 3, 2004, 2 pages.

Architectural and Environmental DIVISION, printed from web site http://www.taiyokogyo.co.jp on Jan. 3, 2004, copyright 1995-2002, Taiyo Kogyo Corporation, 1 page.

Skyspan Architectural Products, printed from web site http://www.skyspan.com on Jan. 3, 2004, copyright 2003, Skyspand International, 2 pages.

Tension Span, Architectural Membrane Structures, printed from web site http://www.vesl-tensionspan.com on Jan. 3, 2004, copyright 2004, 2 pages.

3M United States, Architectural Membranes, printed from web site http://products3.3m.com on Jan. 3, 2004, copyright 3M 1995-2004, 1 page.

Membrane—the "Fifth Building Material", printed from web site http://www.skyspan.com on Jan. 3, 2004, copyright 2003, Skyspan International, 2 pages.

Architectural Membrane Materials, printed from web site http://redskyshelters.com on Jan. 3, 2004, copyright 2000 Red Sky Shelters, 4 pages.

The Seventh International Workshop on the Design and Practical Realisation of Architectural Membrane Structures, Technical University Berlin, May 30-Jun.1, 2002, 7 pages.

International Search Report for PCT/US2004/012862, dated Dec. 14, 2004, 7 pages.

* cited by examiner

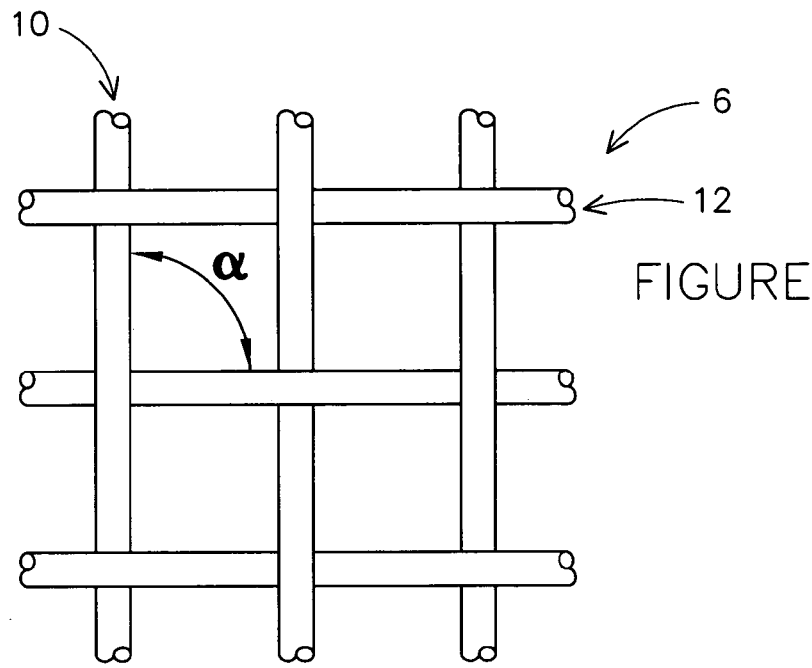
FIGURE 1A
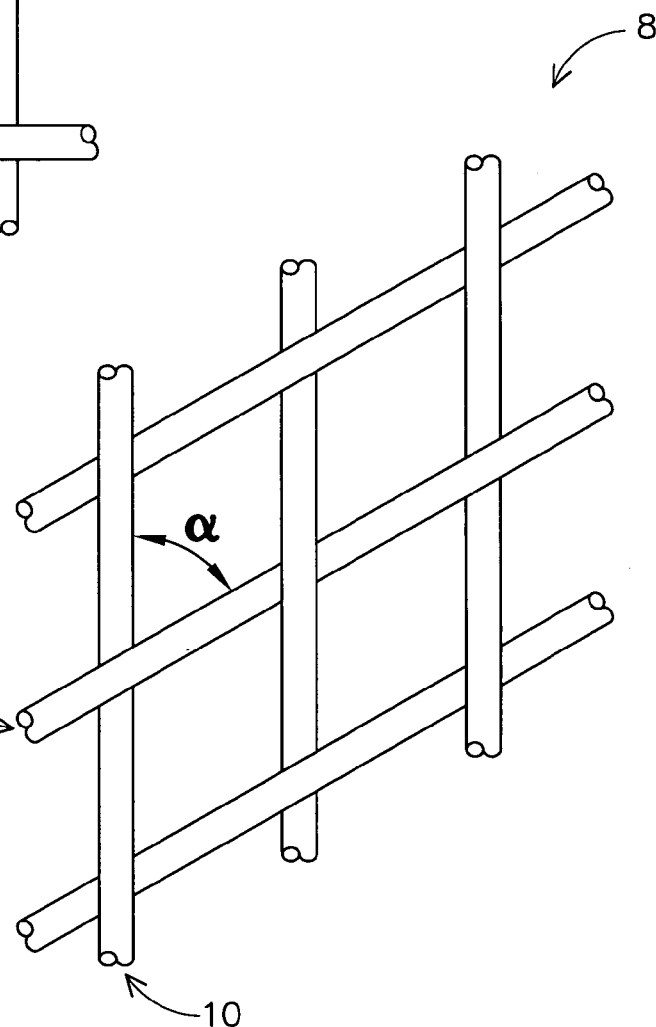
FIGURE 1B
FIGURE 2
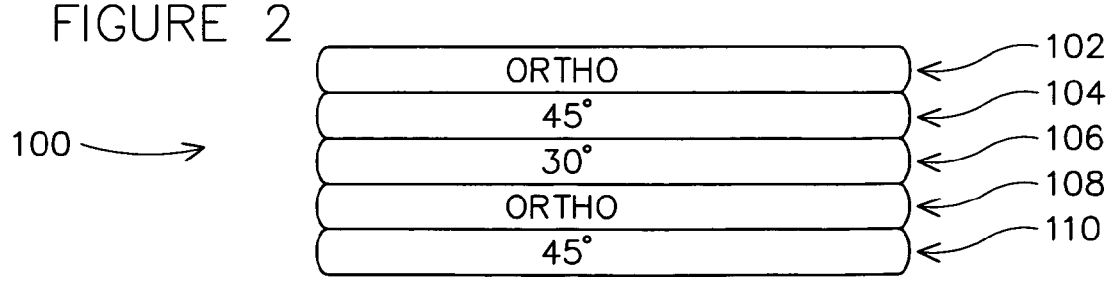

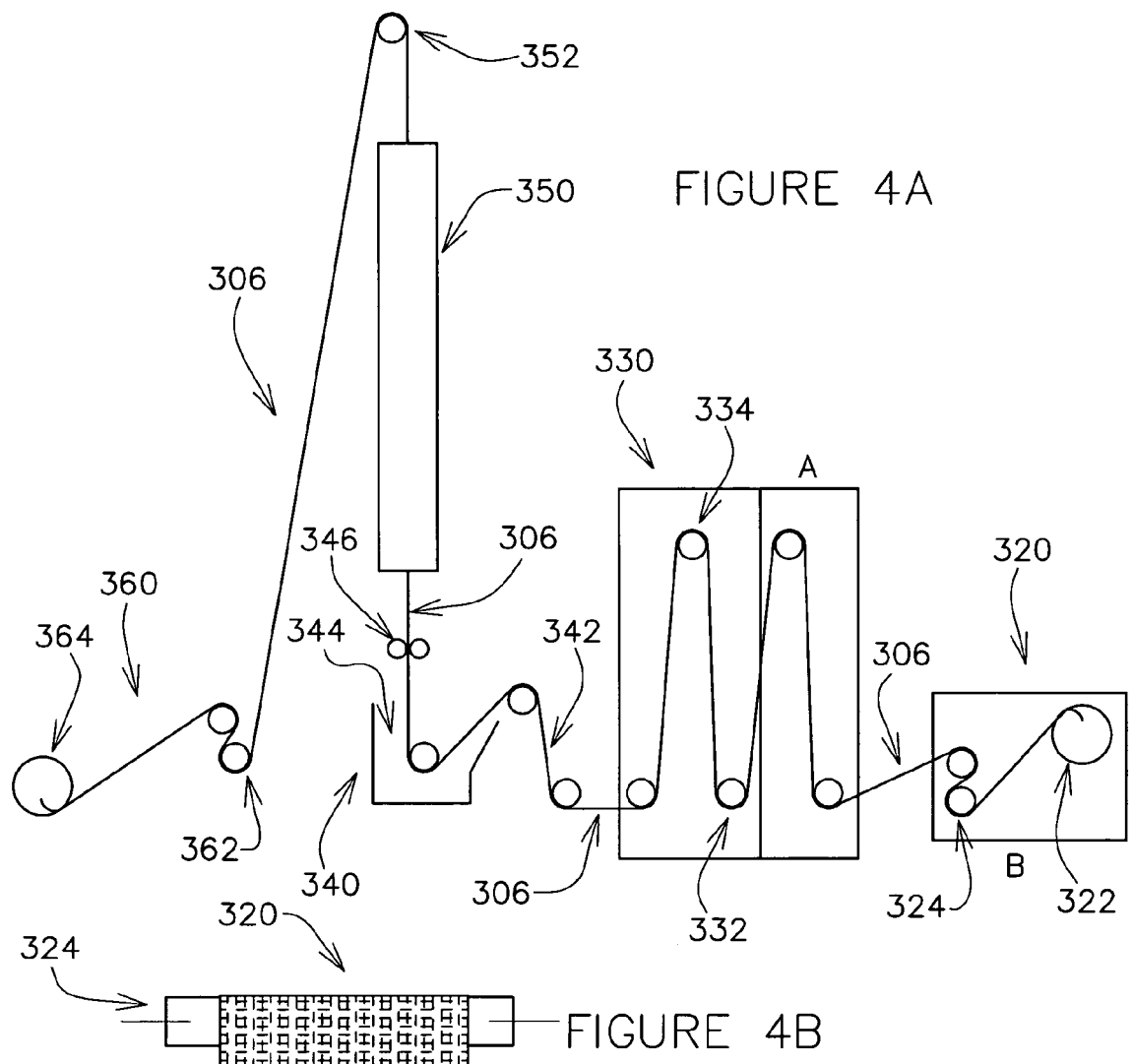
FIGURE 4A
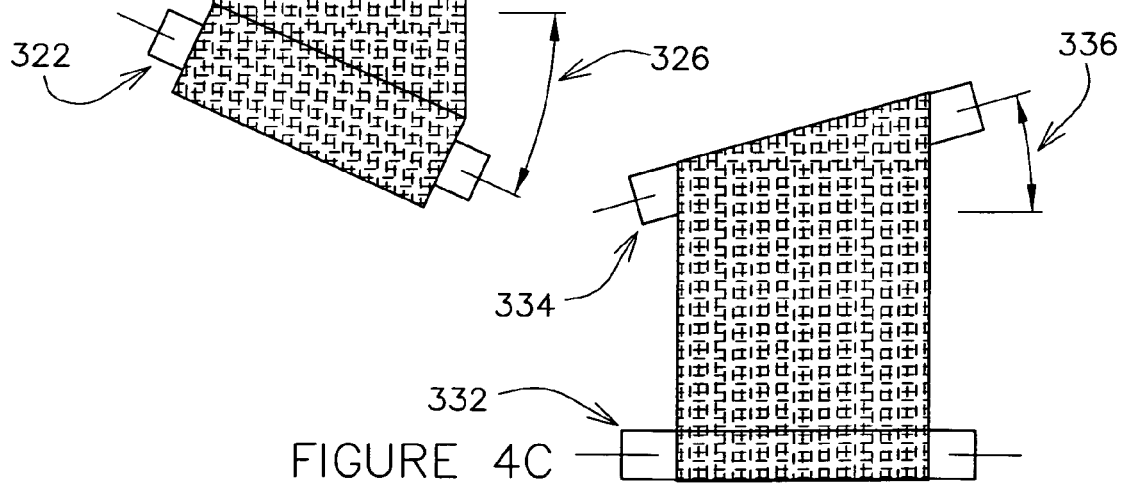
FIGURE 4B
FIGURE 4C

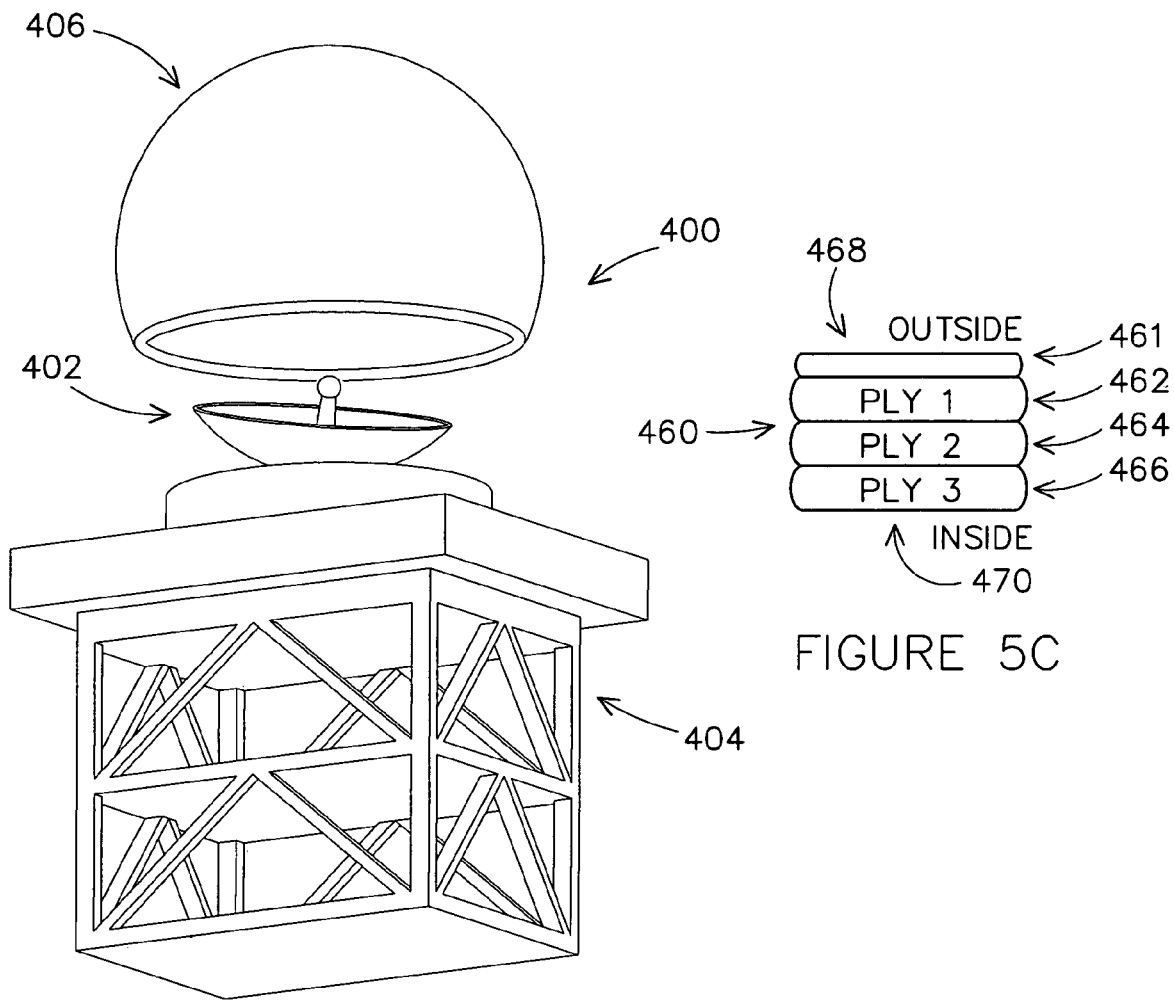
FIGURE 5A
FIGURE 5C
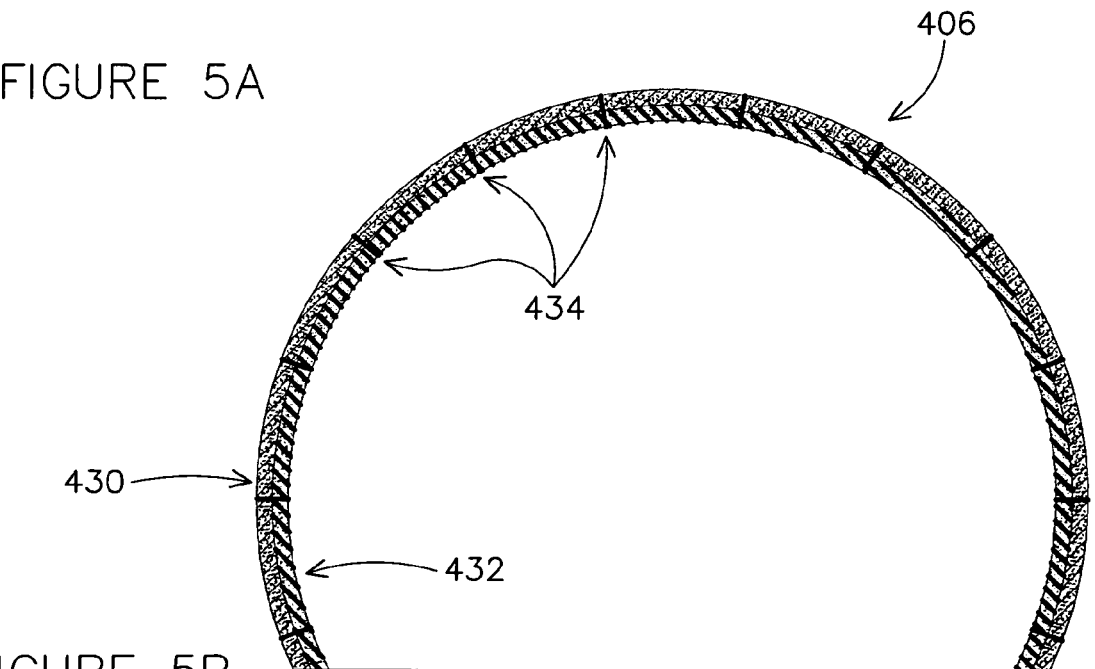
FIGURE 5B

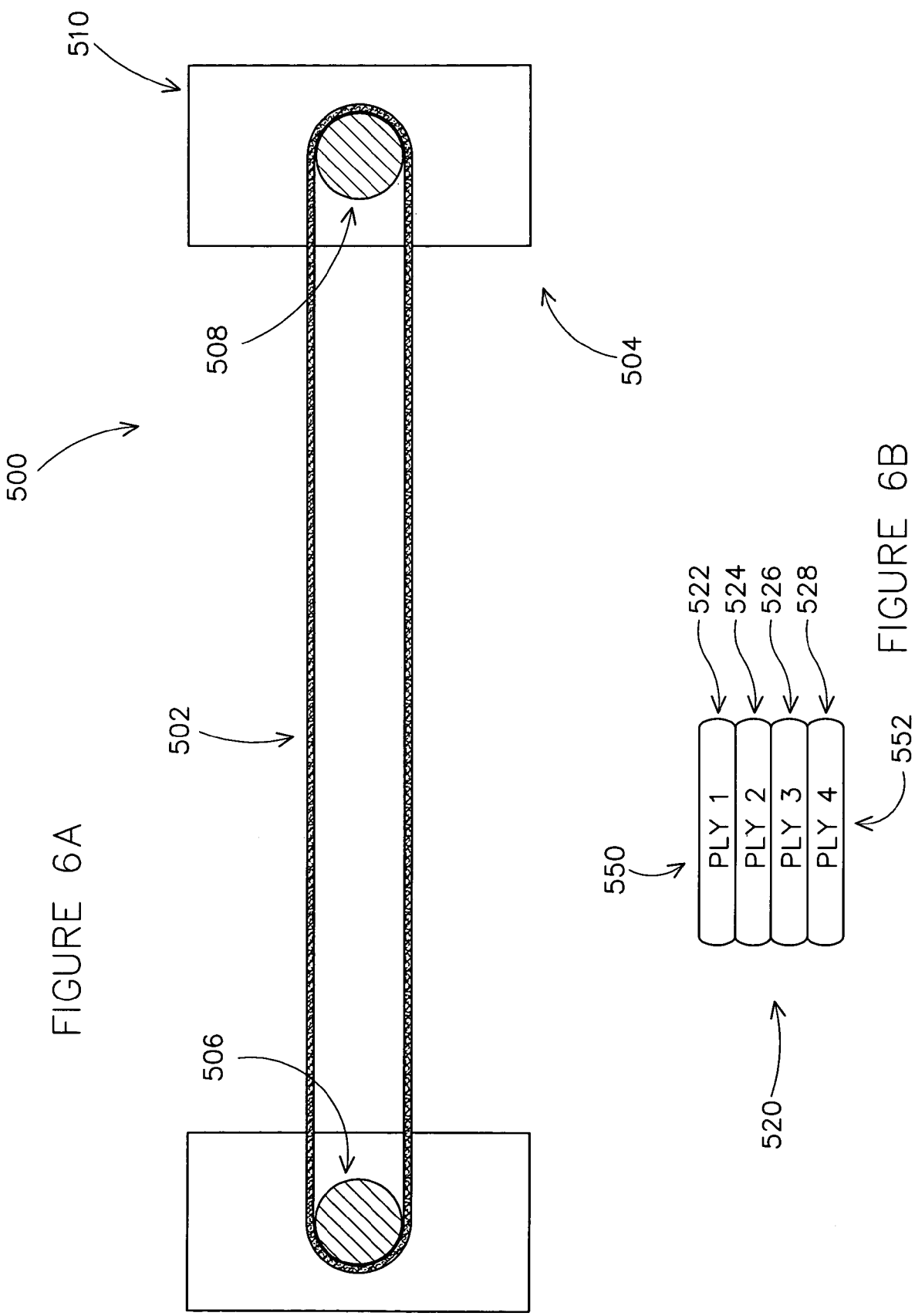

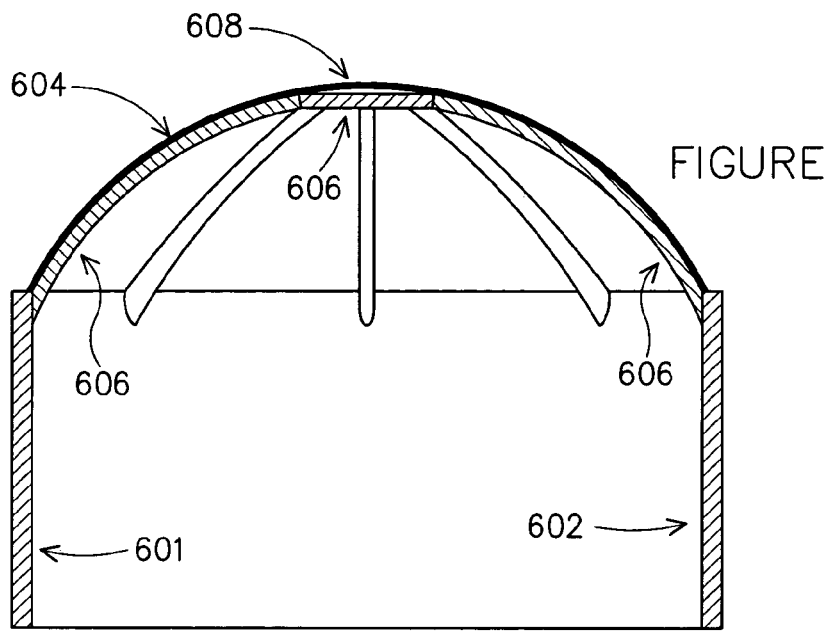
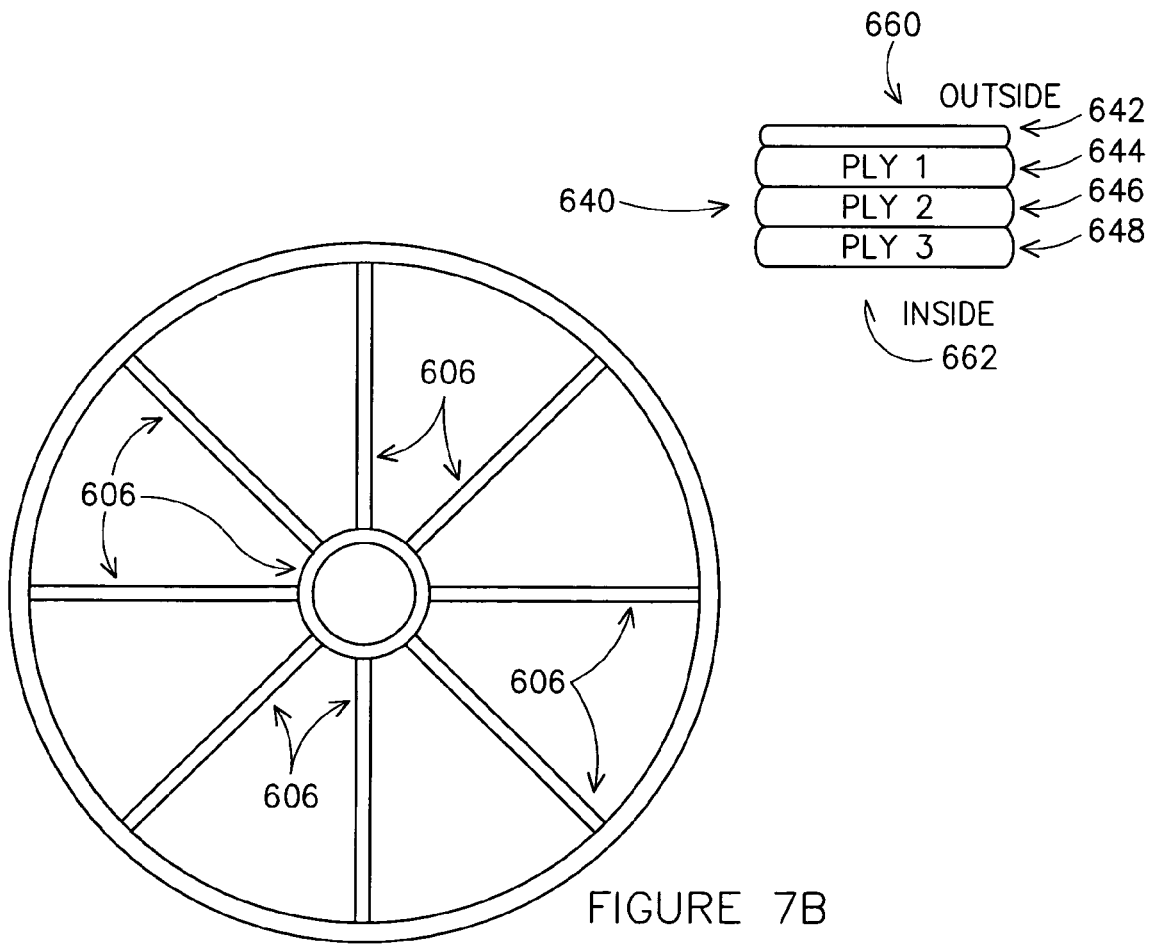

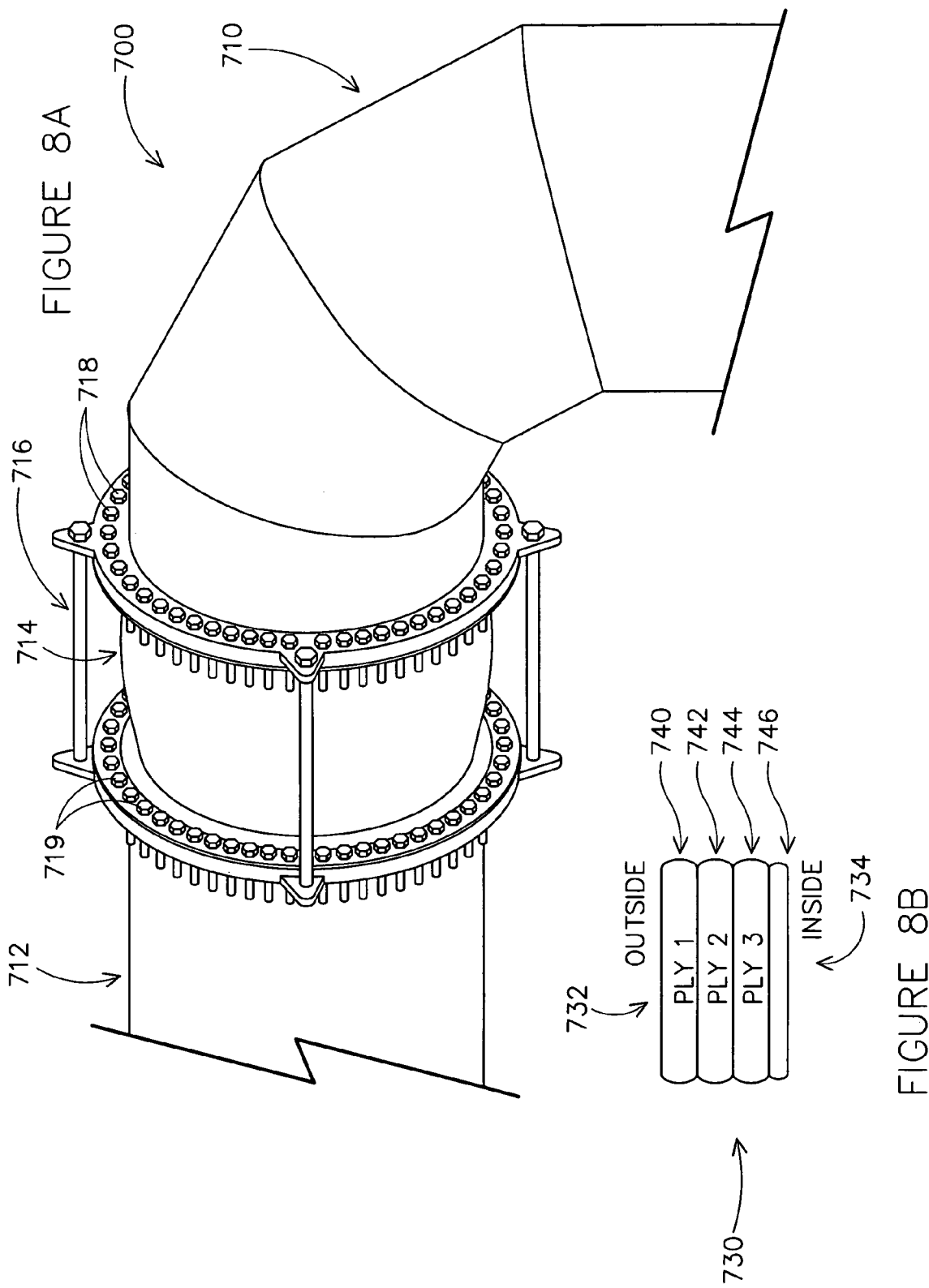

FLEXIBLE COMPOSITES AND APPLICATIONS INCLUDING THE FLEXIBLE COMPOSITES

CROSS-REFERENCE TO RELATED APPLICATIONS

This application claims the benefit under 35 U.S.C. § 119(e) from co-pending U.S. Provisional Patent Application Ser. No. 60/466,762, filed Apr. 30, 2003, incorporated herein by reference in its entirety.

BACKGROUND OF THE INVENTION

Some woven materials are advantageously made by having fill yarns that are not orthogonal to the warp yarns. For instance, material used to make covers for radar antennas, other radar systems, and other types of antennas. These covers may be referred to as "radome covers." Radome covers may be as large as 80 to 168 feet or larger in diameter and can be mounted on a platform or foundation where they are subject to high wind speeds. In some locations, a cover must be capable of withstanding wind speeds up to 200 mph. Because of their size and the possibly high wind speeds, the covers are often exposed to high stresses in all directions along its surface. The covers must also, in many circumstances, be capable of withstanding the effects of harsh environmental conditions (sun, heavy rain, ice, blowing sand, temperature extremes, high winds, etc.). To accomplish this, the cover may be constructed of multiple layers (plies) having yarns running in different directions. This may be accomplished by taking two plies, each having an orthogonal orientation, and stitching or otherwise bonding the two plies together such that the warp yarns of a first ply are at a 45 degree angle from the warp yarns of a second ply.

These covers are used to protect various antennas. For instance, they are typically used to cover weather radar antennas, air surveillance radar antennas, satellite communication station antennas, and other antenna.

Industrial belts are another woven material based product that may advantageously be made by having fill yarns that are not orthogonal to the warp yarns. These belts are often subject to high stresses due to excess applied tension (required to prevent slippage of the conveyor belt on the machine drive rolls), stretching, heavy loads conveyed by the belt, and high speed movement combined with side to side movement induced by guiding systems or off-tracking problems. Applied tension, thermal extremes and thermal shock, often cause belt distortion (e.g. longitudinal ridges). In addition, tracking problems can occur due to uneven warp yarn tension.

Expansion joints are used to span the distance between rigid ductwork, connecting for example, a metal flue duct with a metal or solid emissions stack in a power plant (the various pipes, ducts, and other conduits herein referred to as "conduits" unless stated otherwise in a claim). The expansion joint compensates for and accommodates dimensional changes associated with the expansion and contraction of the ductwork, as it is exposed to thermal cycling. It acts like a bellows as the solid ductwork expands and contracts as it transitions through heating and cooling cycles. The expansion joint must accommodate stresses, intermittent flexing and environmental conditions (high winds, temperature excursions, sunlight, caustic flue gasses) associated with the application.

Many designs for these applications are limited by current technology in making the individual plies. Individual plies can be oriented such that the angle of the fill yarns with respect to the warp yarns is changed. If not purposefully stabilized, yarns that are non-orthogonal tend to revert to an orthogonal pattern. Thus, if handled, these oriented plies tend to lose their preferred orientation. Further, current methods of holding an oriented ply in place often require that the oriented ply be held by tacking, stitching, or bonding it to some other article. This requirement limits the ability to design custom fabrics which have the best combination of properly constructed plies for a particular application. Further, these techniques are awkward and difficult in terms of manufacturing. It would be preferable to have a system that allows individual plies to be manufactured, where the individual plies are able to maintain their orientation. It would also be preferable to have a multi-ply material where each ply contributes a unique contribution to the overall composition; a material where each ply can have its own geometric configuration of the yarns, its own matrix material, and its own resin content.

Under current processes used to make non-orthogonal fabrics, a process is used wherein the fabric must be handled between the time in which the orientation of the fabric is made non-orthogonal and the time at which the non-orthogonal orientation is set. During this time period, the fabric may tend to revert to an orthogonal orientation. It would be desirable to have a continuous process for setting a non-orthogonal orientation of a fabric that shortens the time period in which the fabric may tend to revert to an orthogonal orientation. If a continuous process will not be used, it would be desirable to be able to better maintain the non-orthogonal orientation in the time period between when the orientation of the fabric is made non-orthogonal and the time when the non-orthogonal orientation is set.

The fabrics of many of these materials are desirably coated. This coating can have the purpose of resisting environmental elements, maintaining physical properties (including strength and interply adhesions), or of otherwise making the woven fabric more functional. When plies that have been fixed together (to hold their orientation) before coating, it is difficult to create a multi-ply material with good wet out during the coating process. Poor wet out leads to internal voids and surface defects (blisters, bubbles, and craters) in the coating—possibly from air trying to escape the voids during the coating process.

The teachings herein below extend to those embodiments which fall within the scope of the appended claims, regardless of whether they accomplish one or more of the above-mentioned needs.

SUMMARY OF THE INVENTION

One embodiment is directed to a ply of woven material in which the orientation of the fill yarns are non-orthogonal to the warp yarns. The material further comprises a polymer coating, which stabilizes the non-orthogonal orientation of the yarns.

Another embodiment is directed to a multi-ply woven material. The material includes a first ply having fill yarns orthogonal to its warp yarns, and a second ply having fill yarns that are not orthogonal to its warp yarns. At least the second ply of the material is individually stabilized.

Another embodiment is directed to a multi-ply woven material. The material includes a first ply having fill yarns and warp yarns, and a second ply having fill yarns that are not orthogonal to its warp yarns. At least the second ply of the material is individually coated.

Another embodiment is directed to a multi-ply composite. The composite comprises a first ply and a second ply, the second ply having a non-orthogonal orientation. The second ply is woven and is individually stabilized.

Another embodiment is directed to a composite. The composite comprises a woven ply having a non-orthogonal orientation. The woven ply is individually stabilized by a matrix material selected from the group consisting of silicone rubber, urethane rubber, polyvinyl chloride, polyvinylidene chloride, polyvinyl alcohol, fluoropolymers, urethane, polyurethane, and combinations thereof.

Another embodiment is directed to a flexible composite. The flexible composite comprises a woven ply having a non-orthogonal orientation. The woven ply of the flexible composite is individually stabilized.

Another embodiment is directed to a multi-ply material. The multi-ply material includes a first woven ply, a second woven ply, and a third woven ply fixedly coupled to the first and second plies. At least one ply of the multi-ply material has fill yarns that are not orthogonal to its warp yarns, and each ply has an about equal resin content.

Another embodiment is directed to a multi-ply material. The multi-ply material includes three plies. The middle ply is fixedly coupled to the other two plies and has a resin content at least as high as both of the outer plies. The middle ply has a non-orthogonal orientation.

Another embodiment is directed to a flexible multi-ply material. The flexible multi-ply material comprises a first ply and a second ply. The first ply and the second ply are not coupled to each other by stitching. The plies may be laminated to each other.

Another embodiment is directed to a flexible multiply composite. The flexible multi-ply composite comprises a first ply, a second ply, and a third ply. At least one of the first ply, second ply, and third ply comprises a non-orthogonal orientation. In some embodiments, at least two of the first ply, second ply, and third ply comprise non-orthogonal orientations. Each of the three plies may comprise woven plies. The flexible multi-ply material may comprise a fourth ply.

Another embodiment is directed to a structure comprised of a fabric as disclosed in the previous paragraphs. The structure may comprise a radome comprising a flexible radome cover, a machine comprising a belt, a building comprising a flexible roof and/or a skylight, a piping system comprising a flexible expansion joint, and a boat comprising sails.

Another embodiment is directed to a radome. The radome includes a multi-ply material configured to cover an antenna. The multi-ply material comprises a first ply having fill yarns and warp yarns, and a second ply having fill yarns that are not orthogonal to the warp yarns. At least the second ply of the multi-layer material is individually coated.

Another embodiment is directed to a wireless signal-based structure. The structure includes an antenna, and a cover. The cover includes a multi-ply material having a first ply having fill yarns and warp yarns, and a second ply having fill yarns that are not orthogonal to its warp yarns. At least the second ply of the cover is individually coated.

Another embodiment is directed to a radome cover. The radome cover comprises a woven ply, the ply comprising a first set of yarns and a second set of yarns. The first set of yarns and second set of yarns are arranged such that the ply has a non-orthogonal orientation.

Another embodiment is directed to a radome cover. The radome cover comprises a multi-ply material comprising a first woven ply having fill yarns and warp yarns, the first ply having a negative orientation; and a second woven ply coupled to the first ply and having fill yarns and warp yarns, the second ply having a positive orientation.

Another embodiment is directed to a radome cover. The radome cover comprises a woven ply, the ply comprising a first set of yarns and a second set of yarns arranged such that the ply has a non-orthogonal orientation. The ply of the radome cover is individually stabilized.

Another embodiment is directed to a radome cover. The radome cover comprises a first ply and a second ply. The radome cover has a trapezoidal tear strength of at least about 300 lbs. The trapezoidal tear strength may be measured in a warp, fill, or diagonal direction. The radome cover may have a trapezoidal tear strength of at least about 400 or at least about 600 lbs. The radome cover may have two or more trapezoidal tear strengths of at least about 300 lbs (e.g. warp, fill, first diagonal, and/or second diagonal).

Another embodiment is directed to a radome cover. The radome cover comprises a first ply, a second ply, and a third ply. The radome cover may comprise a fourth ply. One of the plies of the radome may comprise a non-orthogonal orientation. Each of the plies may comprise woven plies.

Another embodiment is directed to a radome comprising a radome cover configured according to any of the embodiments disclosed above.

Another embodiment is directed to a system comprising an antenna and a radome, a radome cover of the radome being configured according to any of the embodiments discussed above.

Another embodiment is directed to an industrial belt. The belt includes a multi-ply material configured to carry a load. The multi-ply material has a first ply having fill yarns and warp yarns, and a second ply having fill yarns that are not orthogonal to the warp yarns. At least the second ply of the multi-ply material is individually coated. Further, the multi-ply material is configured to form a loop.

Another embodiment is directed to a machine having a belt with greater dimensional stability. The machine includes a belt comprising a multi-ply material. The multi-ply material includes a first ply having fill yarns and warp yarns, and a second ply, the second ply having fill yarns that are not orthogonal to the warp yarns. The second ply is individually stabilized. The machine further includes a driving mechanism coupled to the belt such that the driving mechanism causes the belt to move.

Another embodiment is directed to a composite to be formed into a belt. The fabric comprises a woven ply, the ply comprising a first set of yarns and a second set of yarns. The first set of yarns and second set of yarns are arranged in a non-orthogonal orientation.

Another embodiment is directed to a composite to be formed into a belt. The composite comprises a woven ply, the ply comprising a first set of yarns and a second set of yarns arranged such that the ply has a non-orthogonal orientation. The ply of the belt is individually stabilized.

Another embodiment is directed to a composite to be formed as a belt. The composite comprises a multi-ply material comprising a first woven ply having fill yarns and warp yarns, the first ply having a negative orientation; and a second woven ply coupled to the first ply and having fill yarns and warp yarns, the second ply having a positive orientation.

Another embodiment is directed to a belt formed from a composite constructed according to any of the embodiments discussed above. The belt may comprise an open weave belt.

Another embodiment is directed to a machine comprising rollers and having a belt constructed according to any of the embodiments discussed above stretched between the rollers.

Another embodiment is directed to a machine comprising a driving mechanism and having a belt constructed according to any of the embodiments discussed above coupled to the driving mechanism such that the driving mechanism can be operated to cause the belt to move.

Another embodiment is directed to a method of using a belt according to any of the embodiments discussed above. The method comprises carrying packages weighing more than 60 pounds using the belt.

Another embodiment is directed to a method of using a belt according to any of the embodiments discussed above. The method comprises drying articles using the belt.

Another embodiment is directed to an architectural fabric. The architectural fabric comprises a first woven ply; and a second woven ply. The first woven ply and the second woven ply of the architectural fabric are integrally coupled.

Another embodiment is directed to an architectural fabric. The architectural fabric comprises a woven ply, the ply comprising a first set of yarns and a second set of yarns. The first set of yarns and the second set of yarns are arranged such that the ply has a non-orthogonal orientation.

Another embodiment is directed to an architectural fabric. The architectural fabric comprises a woven ply, the ply comprising a first set of yarns and a second set of yarns arranged in a non-orthogonal orientation. The ply of the architectural fabric is individually stabilized.

Another embodiment is directed to a roof comprising an architectural fabric constructed according to any of the embodiments discussed above.

Another embodiment is directed to a structure comprising an architectural fabric constructed according to any of the embodiments discussed above.

Another embodiment is directed to a structure including a roof, the roof comprising an architectural fabric constructed according to any of the embodiments discussed above.

Another embodiment is directed to a fabric expansion joint. The expansion joint comprises a woven ply, the ply comprising a first set of yarns and a second set of yarns. The first set of yarns and second set of yarns are arranged in a non-orthogonal orientation.

Another embodiment is directed to a fabric expansion joint. The expansion joint comprises a ply, the ply comprising a first set of yarns and a second set of yarns arranged in a non-orthogonal orientation. The ply of the expansion joint is individually stabilized.

Another embodiment is directed to an assembly. The assembly comprises a first conduit, a second conduit, and an expansion joint extending between the first conduit and the second conduit. The expansion joint may be constructed according to any of the embodiments discussed above. The first and second conduits may be rigid and may have a fixed position.

Another embodiment is directed to a system for forming an individually stabilized ply. The system comprises an accumulator configured to receive a woven fabric ply; and a means for individually stabilizing a non-orthogonal orientation of the woven fabric ply after it has been accumulated by the accumulator. The ply may be individually stabilized by coating, laminating, or by some other method. An orientation of the ply may be changed by one of an accumulator and a payout station (which may include changing the orientation using both an accumulator and a payout station).

Another embodiment is directed to a system for forming an individually stabilized ply. The system comprises a means for altering an orientation of a woven fabric ply; and a means for individually stabilizing the altered orientation of the woven fabric ply.

Another embodiment is directed to a method of forming a woven material. The method includes inputting a material having warp yarns and fill yarns, changing the angle of the fill yarns with respect to the warp yarns, such that the warp yarns and fill yarns are non-orthogonal, and coating the material at about the time.

Another embodiment is directed to a method. The method comprises coating a material having yarns at an angle to each other, and changing the angle of the yarns with respect to each other in the coated material.

Another embodiment is directed to a method for forming a woven material. The method comprises forming a single ply of material having yarns at an angle with respect to each other, changing an angle of the yarns with respect to each other at a time, and coating the single ply of material at about the same time.

Another embodiment is directed to a method for forming an individually stabilized ply. The method includes weaving a ply having a first orientation; changing the orientation of the ply that has been woven; and individually stabilizing the changed orientation of the ply.

Another embodiment is directed to a method for stabilizing a ply. The method comprises forming a ply having a non-orthogonal orientation; and coating the ply in its non-orthogonal orientation to individually stabilize the ply.

Another embodiment is directed to a method for stabilizing a ply. The method comprises forming a ply having a non-orthogonal orientation; and laminating the ply in its non-orthogonal orientation to individually stabilize the ply.

Another embodiment is directed to a method for forming an individually stabilized ply. The method comprises weaving a ply; maintaining the woven ply in a non-orthogonal orientation for an extended period before the ply is individually stabilized; and individually stabilizing the ply that has been maintained in its non-orthogonal orientation.

A number of methods and products are directed to woven materials. These methods could also be used to form more knitted materials (and other fabrics). Further, even though some embodiments are directed to coating of the fabrics, these fabrics could also be laminated, or go through some other process for applying a stabilizing compound.

Other principle features, advantages, and variations falling within the scope of the invention will become apparent to those skilled in the art upon review of the following drawings, the detailed description, and the appended claims.

BRIEF DESCRIPTION OF THE DRAWINGS

FIGS. 1A and 1B are diagrams showing woven materials with warp and fill yarns at orthogonal and non-orthogonal angles;

FIG. 2 is a layer diagram illustrating a multi-layered material having layers which can be individually coated;

FIGS. 4A to 4C are one illustration of a system that can be used to carry out the method described in FIG. 3B;

FIG. 5A is an antenna based system according to one embodiment;

FIG. 5B is a radome according to one embodiment;

FIG. 5C is a layer diagram of a multi-layer material for use as a radome according to one embodiment;

FIG. 6A is a machine having a fabric based belt according to one embodiment;

FIG. 6B is a layer diagram of a multi-layer material for use as an industrial belt according to one embodiment;

FIG. 7A is a cross-sectional side view of a structure having a roof made of a multi-layer material according to one embodiment;

FIG. 7B is a plan view of the structure shown in FIG. 7A;

FIG. 7C is a layer diagram of a multi-layer material for use as a structural material according to one embodiment; and FIG. 8A is an industrial system incorporating an expansion joint according to one embodiment; and FIG. 8B is a layer diagram of a multi-layer material that may be used to form an expansion joint according to one embodiment.

DETAILED DESCRIPTION OF THE PREFERRED EMBODIMENTS

Figure 3A:
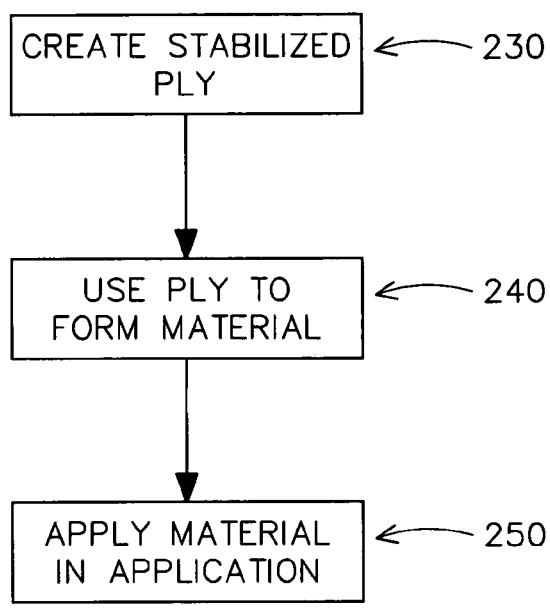
FIG. 3A is a flow diagram of a method for forming flexible composites having at least one ply with a non-orthogonal orientation.

Referring to FIGS. 1A and 1B, an orthogonal ply of woven material 6 includes fill yarns 12 that are orthogonal to warp yarns 10. A non-orthogonal ply of woven material 8, on the other hand, has fill yarns 12 that are not orthogonal to warp yarns 10. Non-orthogonal plies can be characterized by the skew angle ($\alpha$) between warp yarns 10 and fill yarns 12 and the direction in which fill yarns 12 run (from left to right). Skew angle ($\alpha$) is defined by the smallest angle ($0°<\alpha<90°$ for plies with a non-orthogonal orientation) between warp yarns 10 and fill yarns 12. Material 8 is at about a 45° angle and has fill yarns that rise. A material 8 that has fill yarns that rise is typically referred to as having a positive skew angle, having an Z orientation, and/or having a right-hand orientation.

The fact that fill yarns 12 rise is typically inconsequential since a single ply of material 8 is generally symmetrical, and, when coated as an individual ply, can be flipped over to have fill yarns 12 that fall. In a multi-layer material, orientation may be determined with respect to some reference. For instance, in a radome, orientation is determined with reference to an observer who is on the inside of the radome. The same may be true when using the multi-layer material in an architectural and/or expansion joint application.

Reference to orientation of a ply is a reference of the orientation of a first set of yarns of the ply (e.g. fill yarns) with respect to a second set of yarns that are non-parallel to the first set (e.g. warp yarns). Unless stated otherwise, "orientation" of a ply is generally a reference to the skew angle of the yarns of the ply.

Reference to a shape/geometry of a ply or a multi-layer material shall mean the three-dimensional form of the ply and/or the material.

Skew angle shall be a reference to the angle formed between one set of yarns (e.g. warp yarns) and a second set of yarns (e.g. fill yarns) if the ply were placed as a flat (generally two-dimensional) sheet. Sets of yarns that are parallel would have a 0 degree skew angle and sets of yarns that are orthogonal would have a 90 degree skew angle. In a woven material, skew angle generally refers to the angle formed by the warp yarns and fill yarns.

A matrix material is generally a different material than the fibers/yarns which it holds in place. While matrix materials are discussed herein with respect to some embodiments, any place that the term matrix material is used in the description of the figures, the description could alternately use the terms stabilizing agent or bonding agent.

Fabric as used herein shall refer to a textile structure produced by interlacing yarns, fibers, or filaments. Fabric tends to initially be substantially planar, but the fabric may tend to curl, or otherwise deform from a planar shape due to the orientation of the layer(s) used to make the fabric. A fabric with a non-planar shape is contemplated by this application.

A fabric according to this application tends to be formed by weaving and/or knitting. Fabric having woven and/or knitted plies shall be referred to as an intertwined fabric or an intertwined ply. Weaving as used herein is not limited to joining two yarns made of similar materials.

A coated fabric as used herein shall refer to any fabric to which a substance such as a lacquer, plastic, resin, rubber, or varnish has been applied in firmly adhering layers to provide certain properties, such as stabilization of the orientation of the fabric.

Reference to a non-orthogonal orientation of a ply is a reference to a non-orthogonal orientation of at least a whole section of the ply, and not merely a reference to the orientation of the ply at certain points (such as at the fringes of the ply). Further, reference to a non-orthogonal orientation is generally a reference to a ply having a skew of of more than about 5 and less than about 85. These limits are set to differentiate between manufacturing deviations that occur in orthogonal plies, and plies that actually have a non-orthogonal orientation as the term is meant to be used herein.

Referring to FIG. 2, a multi-layer material 100 has a first orthogonal layer 102 (alpha $\approx 90°$), a first non-orthogonal layer 104 (alpha $\approx 45°$), a second non-orthogonal layer 106 (alpha $\approx 30°$), a second orthogonal layer 108 (alpha $\approx 90°$), and a third non-orthogonal layer 110 (alpha $\approx 45°$). While not common in a large number of embodiments, it is conceivable that a single ply may have multiple orientations. In most embodiments, a single ply will have substantially the same orientation throughout the ply (i.e. there may be minor deviations in the orientation—for instance, at the fringes of the ply—but the ply general has a constant orientation throughout the ply).

The individual layers can be individually designed and individually coated. When the layers are individually coated, each layer can have its own yarn material and matrix material, and its own yarn geometry and resin content. Further, layer 110 may have its non-orthogonal yarn orientation maintained by individually coating layer 110, while layers 104 and 106 (or some other layers) have their non-orthogonal yarn orientation maintained by use of stitching.

Multi-layer material 100 may be designed to be a flexible composite. Examples of applications that may employ flexible composites include radome covers (especially air-supported radome covers), belts, roofing, skylights, and other architectural fabrics, and fabric-based expansion joints.

Multi-layer material 100 may comprise at least three plies. In other embodiments, multi-layer material 100 may comprise at least four plies. These plies may be woven plies. One or more of these plies may have a non-orthogonal orientation, which orientation may be individually stabilized for that ply.

Layers 102 to 110 can be held together by any number of means. For instance, they can be powder bonded, laminated, stitched, etc. Also, even if the individual layers are coated, multi-layer material 100 can have an additional coating applied after any combination of layers 102 to 110 have been combined.

Multiple advantages can be achieved by forming multi-layer materials from individually coated/stabilized plies. For instance, non-orthogonal plies made by conventional methods are not coated until after two or more plies have been stitched or otherwise bonded together. When these materials are coated, the resulting material tends to have larger numbers of surface defects and void spaces. Multi-layer materials made by individually coating a single ply, on the other hand, tend to have fewer void spaces and fewer surface defects.

Also, multi-layer materials made by individually coating single plies can lead to unique arrangements. For instance, a middle layer can have a higher resin content (amount of resin per square yard) than its two adjacent layers. Also, different resin types can be used for adjoining layers.

Individual plies according to some embodiments may have a skew angle that is no less than about 30 degrees or 40 degrees. Individual plies according to some embodiments may have a skew angle that is no more than about 60 degrees or 50 degrees. These embodiments may be in any shape, including, but not limited to, radome covers, belts, architectural fabrics, and expansion joints.

According to some embodiments of a multi-ply material, the multi-ply material will comprise a first ply having a positive orientation and a second ply having a negative orientation. According to most of these embodiments, the two opposing orientations occur in overlapping sections of the two plies. Again, these embodiments may be in any shape, including, but not limited to, radome covers, belts, architectural fabrics, and expansion joints. According to some embodiments, one or more of the plies will have a substantially closed (non-porous) structure. Further, the composite as a whole may have a substantially closed structure. The substantially closed structure may be a result of a tight weave of the yarns. According to other embodiments, the composite may have an open structure such as an open weave structure.

Referring to FIG. 3A, a method for creating a multi-layer fabric for a particular application includes creating a stabilized ply of material at block 230, using the stabilized ply (typically in conjunction with other plies) to form a multi-layer fabric suitable for the application at block 240, and then applying the material to the application at block 250.

Figure 3B:
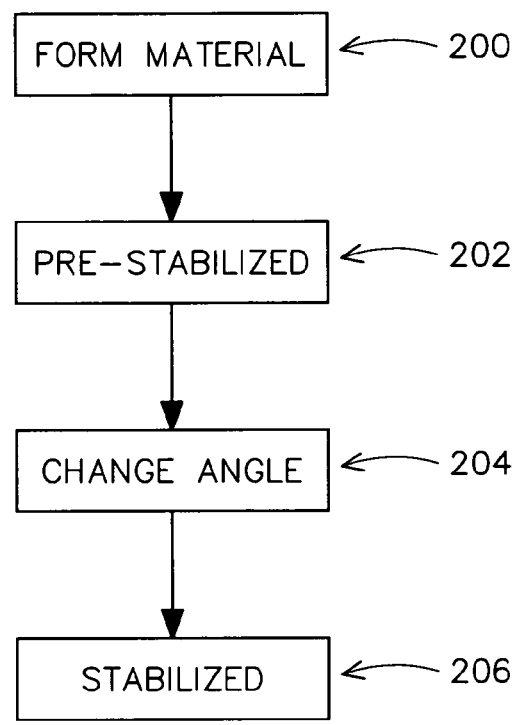
FIG. 3B is a flow diagram for a method for forming single layer materials which can maintain a non-orthognal warp yarn—fill yarn relationship (orientation) without being fixed to another layer prior to stabilization of the orientation.

Referring to FIG. 3B, a method for forming a stabilized ply at block 230 may include forming the material at block 200. The material could be formed by any number of conventional weaving or knitting procedures. The material could also be formed by any other procedure that can create a material with one set of yarns at an angle to another set of yarns. Some yarns that may be used to form the plies include fiberglass, nylon, polyester, aramid (such as KEVLAR® or NOMEX® available from Dupont), polyethylene, polyolefins, polyimides, carbon, polybenzimidazole (PBI), polybenzoxazole (PBO), and/or fluorocarbon. Further, other materials may be used to form the yarns of a ply. A yarn may be formed from one of these materials or may comprise a combination of these materials (potentially twisted together).

In a ply having warp yarns and fill yarns, the warp yarns and the fill yarns may have different compositions than each other. Further, the warp yarns may be a uniform composition (i.e. all warp yarns are made of about the same materials) or may have a non-uniform composition (i.e. some warp yarns have a different composition than other warp yarns). Further still, the fill yarns may have a uniform composition or may have a non-uniform composition.

An optional matrix material can be applied to the formed material at block 202 prior to changing the angle of the yarns. The matrix material could be any number of materials applied in any number of manners. For example, the matrix material could be a silicone rubber, urethane rubber, a urethane, a polyurethane, polyvinyl chloride, polyvinylidene chloride, polyvinyl alcohol, and their copolymers with acrylic acid or acrylic acid esters or other vinyl ester monomers, fluoropolymers, including fluoroplastics (such as PTFE, FEP, TFA, ETFE, THV, etc.) and fluoroelastomers, some other polymeric material, or blends thereof. Typical fluoropolymer matrix materials may include monomers of chlorotrifluoroethylene (CTFE) and vinylidene fluoride (VF2), either as homopolymers, or as copolymers with TFE, HFP, PPVE, PMVE and ethylene or propylene. Additionally, the fluropolymer matrix material could comprise a perfluoropolymer such as homopolymers and copolymers of tetrafluoroethylene (TFE), hexafluoropropylene (HFP) and fluorovinyl ethers, including perfluoropropyl and perfluoromethyl vinyl ether. Other materials may also be used as the matrix material. The applied material could alternatively be some other type of stabilizing agent.

The matrix material could be applied by coating the formed material, laminating the formed material, powder bonding the formed material, being sprayed onto the formed material, etc.

The matrix material is preferably impregnated into the yarns with minimal encapsulation; the goal being to add some stability to the shape of the formed material, while at the same time allowing a change in the shape of the material to be carried out.

After block 202, the angle of the fill yarns with respect to the warp yarns is changed at block 204. Since most materials are formed in their orthogonal state, changing the angle typically involves making the material become non-orthogonal. Also, changing the angle typically involves changing the angle throughout the material. For instance, a section of the material (a section being defined by one point along the warp yarns to another point along the warp yarns) where all of the fill yarns are substantially orthogonal to the warp yarns would change to a section where all of the fill yarns are substantially non-orthogonal to the warp yarns (while ideally all of the yarns would face the exact same direction, there will inevitably be some minor deviations from the desired angle on occasion, especially near the edges).

Additionally, changing the angle at block 204 may be carried out in more than one step. For instance, a 45° angle may be too severe an angle to form in one step, so the 45° angle can be formed first as a 30° angle and then the 30° angle is converted to a 45° angle.

Once the angle has been set at block 204, the single ply material is then stabilized at block 206. This process typically occurs at or about the same time as the angle is formed (e.g. within about a minute or less depending on the speed with which the material is moved through the production line). This typically reduces the amount of deviation from the desired angle, because the non-orthogonal yarns would have less of a chance to revert to an orthogonal pattern.

Alternately, a technique may be used to maintain the changed orientation of the fabric. The fabric may then be transported from the device used to change the orientation and coated at a later point in time. One such technique for maintaining a non-orthogonal orientation of an individual ply is an interleaf technique. If used, the technique used to maintain the non-orthogonal orientation of the ply can preferably be able to maintain the orientation for extended periods of time (e.g. more than one day).

The material used as a stabilizer at block 206 can be the same as, or can be different from, that used as the optional impregnating material added at block 202. The same list of materials discussed above with respect to block 202 may be used at block 206. The stabilizing at block 206 preferably more firmly sets the angle of the material, although, while it can be held firmly and rigidly in place, the orientation of the ply need not be locked in place or made entirely rigid. Material that has been stabilized at block 206 can preferably hold its shape, in its individual layer form, for extended periods of time.

Here, a material is considered "stabilized" even if no physical fixing to another substance has taken place, so long as a substance (the stabilizing agent) introduced to the formed material greatly increases the resistance of a non-orthogonal material to deviate from its preferred, non-orthogonal orientation.

A ply which has such a stable orientation that it will not tend to easily revert to some other orientation may be considered stabilized. A ply which achieves this stabilization before being joined with additional plies may be considered individually stabilized. An individual ply which achieves this individual stabilization by the introduction of a matrix material may be referred to as a ply that is individually stabilized by a matrix material.

This individual stabilization is a particularly useful property for a non-orthogonally orientated ply to have, although not all embodiments of non-orthogonally oriented plies according to the claimed subject matter need be individually stabilized. Reference to a non-orthogonal ply in a claim does not imply that the ply is individually stabilized unless expressly stated in the claim.

Figure 3C:
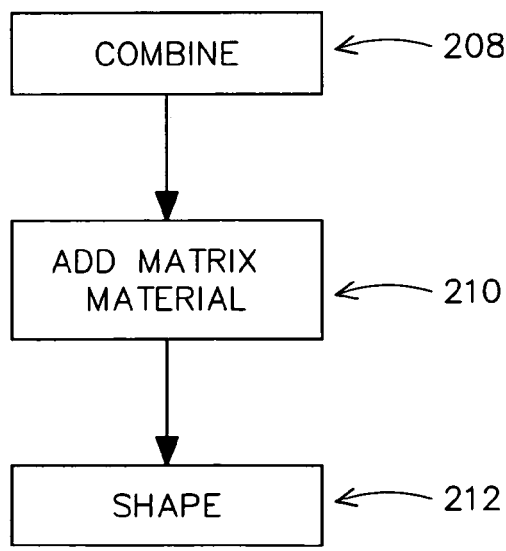
FIG. 3C is a flow diagram for a method for forming multi-layer materials from various preformed plies.

Referring to FIG. 3C, a method for forming the material at block 240 may include combining the individual plies which have been stabilized in place at block 230 to form a multi-layer material at block 208. The multi-layer material can further be formed using uncoated layers, multi-layer materials not having individually coated layers, non-fabric layers (such as protective coatings), etc.

Additional matrix material may be applied to the multi-layer material at block 210. Also, other coatings and laminations can be added to the multi-layer material to affect the properties of the material.

The material is then shaped at block 212. Some typical shapes for the material depend on the use of the multi-layer material. For instance, when used as radomes, the material is typically formed into pieces that can be combined to form a truncated sphere. When used as an industrial belt, the material is typically left in a rectangular shape, which then is connected at its ends. Also, other substances, such as inductive elements can be added to the material.

Once the multi-layer material is in its formed shape at block 212, further coatings and laminations can be applied to the multi-layer material to hold the orientation, and/or to give it other desired properties.

Figure 3D:
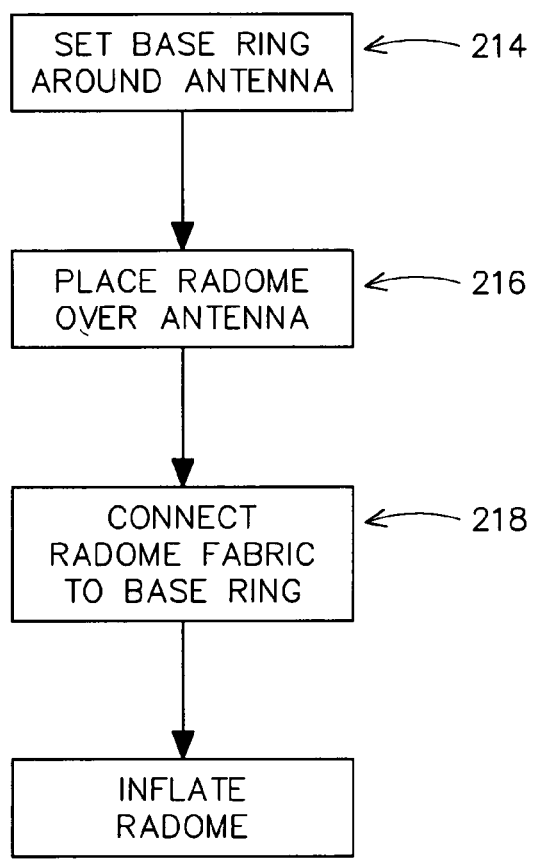
FIG. 3D is a flow diagram of a method for forming a radome from a multi-layer material having at least one ply having a non-orthogonal orientation.

Referring to FIG. 3D, in one embodiment an article having an individually stabilized ply with a non-orthogonal orientation may be applied at block 250 to an air-supported radome. In a radome having such a stabilized ply, a base ring may be set around the base of the antenna at block 214. The base ring may have a plurality of clamps and may be prepared with an adhesive secured gasket and/or anti-seizing spray.

The radome fabric is then placed over the antenna at block 216. The radome fabric may be lifted over the antenna using a crane. Depending on the construction of the radome, this step may be better accomplished if wind speeds are not high.

The radome fabric is then connected to the base ring at block 218 this may be done by way of the clamps on the base ring. Once this is accomplished, an air-supported radome may be inflated (e.g. using blowers).

Figure 3E:
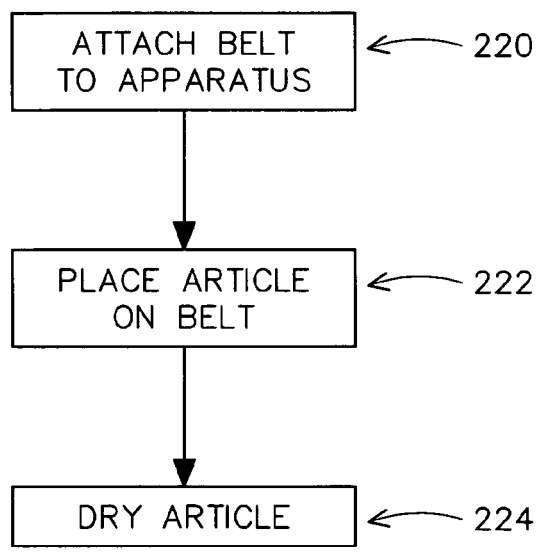
FIG. 3E is a flow diagram of a method of using a belt comprising at least one ply having a non-orthogonal orientation.

Referring to FIG. 3E, a belt comprising an individually stabilized ply may be attached to an apparatus at block 220. An article may then be placed on the belt at block 222. The article may be a heavy article and may have a weight of at least about 40 or 60 pounds. If the apparatus at block 220 is part of a system for drying articles, the belt may be used to dry the article at block 224. Using a belt to dry or cure an article may include using the belt to convey the article through a zone of increased temperature often in conjunction with a cooling zone. The belt is thus subject to both thermal extremes and thermal cycling.

Referring to FIG. 4A, an embodiment of an apparatus for forming plies of material with a non-orthogonal orientation includes a payout station 320 which pays out fabric to an accumulator 330. Fabric from accumulator 330 passes through dip pan 340 where fabric 306 is coated with matrix material. Fabric from dip pan 340 passes between metering bars 346 and goes through tower 350. Tower 350 may be used to dry, bake, sinter, and/or cure the matrix material onto the fabric. After passing through tower 350, the fabric is taken up by take-up 360.

Payout station 320 may be used to skew fabric 306. Referring to FIG. 4B, payout station 320 includes a roll 322 carrying material with a starting orientation. The material is fed from roll 322 to capstan rollers 324. Roll 322 may be set at an angle 326 from rollers 324. When angle 326 is non-zero, the tension between roll 322 and rollers 324 may cause fabric 306 to change its orientation. Angle 326 is generally placed between zero and forty-five degrees.

Accumulator 330 may also be used to skew fabric 306. Referring to FIG. 4C, accumulator 330 includes upper accumulator rolls 334 and lower accumulator rolls 332. If upper rolls 334 and lower rolls 332 are placed at a non-zero angle 336 with respect to each other, then tension between rolls 334 and rolls 332 may cause fabric 306 to change its orientation. Here, upper rolls 334 are shown as the rolls which are adjusted to adjust angle 336. In other embodiments, lower rolls 332 are adjusted or both upper rolls 334 and lower rolls 332 are adjusted. This process may be repeated within the accumulator for each of the sets of rollers. Angle 336 may be set to be between zero and fifteen degrees, or may be set equal to zero or fifteen degrees.

In some embodiments payout station 320 is used to change the orientation of fabric 306. In other embodiments, accumulator 330 is used to change the orientation of fabric 306. In either of these embodiments, a combination of payout station 320 and accumulator 330 may be used to change the orientation of fabric 306.

Capstans 324, 342, and 362 may be used to adjust the amount of tension provided to fabric 306. Also, the distance between metering bars 346 may be used to control the thickness of an applied coating. Further, the shape of metering bars 346 may be used to control the surface texture of fabric 306. For instance, a metering bar 346 may include notches to form ribs on fabric 306, and may move from side to side to form the ribs in a non-linear pattern.

Instead of using a dip coating apparatus, some other coating apparatus may be used to coat fabric 306.

Radomes

Referring to FIGS. 5A and 5B, an assembly 400 includes an antenna 402 supported on a tower 404. Antenna 402 is covered by radome 406 which is also supported on tower 404. Antenna 402 could alternately be located on a building, could be ground-based, etc.

Radome 406 is configured to protect antenna 402 from the elements without causing significant interference to the signals to be transmitted and received by antenna 402. Radome 406 may be configured to have good performance at high frequencies and/or good performance at multiple frequencies. Radome 406 would preferably have low transmissive, absorptive, and/or reflective loss of signal at high/multiple frequencies. A lack of significant interference may indicate that the radome cover contributes to a signal loss of no more than about 0.5% of the signal strength from the signal source at at least one and potentially at multiple frequencies. Good performance may indicate that the radome cover contributes to a signal loss of no more than about 0.05% at one or more frequencies.

Antenna 402 may be a high frequency radar antenna. Antenna 402 could be a phased array or a dish (such as a parabolic dish, a split cylinder dish) and may be rotating or non-rotating. Radomes 406 are used as part of a number of different types of radar system assemblies. For example, radomes 406 can be used in conjunction with weather radar systems, and airport radar systems.

Instead of using a radar antenna, assembly 400 could include other antennas 402, one such antenna being a satellite communication antenna. One example of an assembly 400 using a satellite communication antenna is a ground terminal for the US Air Force unmanned aircraft.

Radome 406 primarily includes a multi-layer material 430. Multi-layer material 430 is typically between about 0.04 and 0.1 inch thick, although other thickness are possible. In some embodiments, multi-layer material 430 may be less than 0.04 inches or may be as thick as 0.3 inches. In one embodiment, multi-layer material 430 is about 0.07 to 0.09 inches thick.

In some embodiments, multi-layer material 430 may have a warp trapezoidal tear strength of at least about 300 lbs, or may be selected to have a warp trapezoidal tear strength of at least about 450 lbs. In another embodiment, multi-layer material 430 may be selected to have a warp trapezoidal tear strength of at least about 650 lbs.

In some embodiments, multi-layer material 430 may have a fill trapezoidal tear strength of at least about 300 lbs, or may be selected to have a fill trapezoidal tear strength of at least about 450 lbs. In another embodiment, multi-layer material 430 may be selected to have a fill trapezoidal tear strength of at least about 650 lbs.

In some embodiments, multi-layer material 430 may have a trapezoidal tear strength at a first diagonal of at least about 300 lbs, or may be selected to have a diagonal trapezoidal tear strength of at least about 450 lbs. In another embodiment, multi-layer material 430 may be selected to have a diagonal trapezoidal tear strength of at least about 650 lbs. In some of these embodiments, multi-layer material 430 may have a trapezoidal tear strength at a second diagonal of at least about 300 lbs, or may be selected to have a second diagonal trapezoidal tear strength of at least about 450 lbs. In another of these embodiments, multi-layer material 430 may be selected to have a second diagonal trapezoidal tear strength of at least about 650 lbs.

In some embodiments, multi-layer material 430 may have a weight of at least about 65 osy or may be selected to have a weight of at least about 75 osy. In some embodiments, multi-layer 430 material may be selected to have a weight of less than about 100 osy or may be selected to have a weight less than about 90 osy.

In some embodiments, multi-layer material 430 may have a warp strip tensile strength of at least about 1300 lbs./in. or may be selected to have a warp strip tensile strength of at least about 1600 lbs./in. In one embodiment, multi-layer material 430 may be selected to have a warp strip tensile strength of no more than about 1900 lbs./in.

In some embodiments, multi-layer material 430 may have a fill strip tensile strength of at least about 1300 lbs./in. or may be selected to have a fill strip tensile strength of at least about 1600 lbs./in. In one embodiment, multi-layer material 430 may be selected to have a fill strip tensile strength of no more than about 1900 lbs./in.

In some embodiments, multi-layer material 430 may have a warp tensile strength after a 50 pound creasefold of at least about 1200 lbs./in. or may be selected to have a warp tensile strength after a 50 pound creasefold of at least about 1650 lbs./in. In some embodiments, multi-layer material 430 may have a warp tensile strength after a 50 pound creasefold of no more than about 2000 lbs./in., or may be selected to have a warp tensile strength after a 50 pound creasefold of no more than about 1900 lbs./in.

In some embodiments, multi-layer material 430 may have a fill tensile strength after a 50 pound creasefold of at least about 1200 lbs./in. or may be selected to have a fill tensile strength after a 50 pound creasefold of at least about 1650 lbs./in. In some embodiments, multi-layer material 430 may have a fill tensile strength after a 50 pound creasefold of no more than about 2000 lbs./in., or may be selected to have a fill tensile strength after a 50 pound creasefold of no more than about 1900 lbs./in.

According to one embodiment, a foam layer 432 may be added to multi-layer material 430. Foam layer 432 primarily serves as a layer of insulation for antenna 402. Foam layer 432 may also serve to provide structural support to radome 406. As illustrated in FIG. 5B, radome 406 may also include structural support elements 434 integrally connecting portions of radome 406, which are used as supports for the structure of radome 406.

While not limited to such radomes, the fabrics described in the present application may have a greater contribution to radome covers that rely on multi-layer material 430 to provide the primary structural support for the radome cover. These radomes may be radomes that do not include foam layer 432 and/or secondary structural support elements 434.

One example of a radome in which multi-layer fabric 430 may serve as a primary structural member responsible for bearing loads is an air-supported radome. An air-supported radome may rely on a difference in air-pressure (e.g. a higher air pressure inside the radome) to support the radome instead of relying solely on structural support elements 434. Typical air-supported radomes 406 may be configured to not include secondary structural support elements 434 at all. An air-supported radome 406 may also lack foam layer 432.

An air-supported radome may include a blower pressurization system configured to maintain the increased air pressure. In one embodiment, the blower pressurization system comprises a three-stage blower pressurization system. The blower pressurization system may include a blower such as a 230/460 VAC, 3 phase, 60 Hz power blower, may include one or more anemometers, an external pressure tap, and an air intake assembly. An air-supported radome 406 may also include a galvanized steel base ring assembly, and a lifting ring. Radome 406 may also include airlock door assemblies, a lightning rod assembly, and circulation fans.

Some objectives for selecting characteristics of a multi-ply material used to form a radome include providing high tensile strength in multiple directions (such as three or four directions), retaining tensile strength in the multiple directions after handling and flexing, balanced elongation/modulus in the multiple directions, inter-ply integrity, flexibility, ability to pattern, fabricate, and cut the material, and the ability to both be RF transmissive with a low loss of signal strength and/or accuracy and not sustain negative side effects from RF transmission—such as overheating—(e.g. choosing materials with low amounts of interaction with the signal(s) at their intended frequency or frequencies).

A primary consideration for meeting the objectives is the selection of an appropriate yarn material. The properties of the material from which the yarns are made can have a significant affect on the tensile strength of the radome, the retained tensile strength of the material, the flexibility of the radome, resistance to environmental elements, balance of modulus and elongation, and other of the objectives listed above. For instance synthetic fibers, especially an aramid such as KEVLAR, may provide sufficient flexibility and retention of tensile strength for use in radome applications. Matrix materials can also be selected for specific characteristics. Typically, fluoroploymers are selected to withstand temperature requirements, provide sufficient RF transmissivity and to provide protection from the elements (rain, sun, etc).

Also, the use of orthogonal and non-orthogonal plies should be a primary design consideration. When non-orthogonal plies are used, the size and direction of the oriented yarns may affect how the loads are shared. A proper choice of orientation, angle and direction, could result in a more even distribution of load sharing between yarns, and may result in more even load sharing in multiple directions. Further, non-orthogonal layers may be combined having one layer with a positive angle and another layer with a negative angle to achieve better results. Also, the selection of the orientation of individual plies of the multi-ply material may affect the overall tensile strength of the radome in the various directions.

Other considerations that may affect these properties include the processing history (such as thermal cycling), use of twisted yarns, crimp balance, and choice of which yarns will bear structural loads.

Yarns bearing structural loads will typically be thicker than yarns that are not intended to bear structural loads. Reference to a non-structural yarn does not mean that when placed in the field the yarn will not be subjected to and bear some loads, but rather, that it is not intended to be a primary bearer of the load.

Structural yarns may be placed in even increments around the fabric (i.e. the structural yarns may be located every certain angle amount—such as every 30 degrees, every 45 degrees, every 60 degrees, etc.). Alternatively, the structural yarns may be placed in uneven increments around the fabric (i.e. not at regularly spaced intervals).

The number of directions in which structural yarns extend in a multi-layer material may be used to differentiate the multi-layer material. For instance, a material having structural yarns in two directions may be referred to as bi-axial, three directions is tri-axial, etc. An orthogonal ply with structural warp and fill yarns would be considered to be bi-axial. A multi-layer material having two orthogonal plies where the warp yarns of one ply are rotated 45 degrees from the warp yarns of the other ply, and where the warp and fill yarns of each ply contain structural yarns would be considered to be a quadri-axial material. Radome covers and flexible composites according to some embodiments would comprise multi-axial materials.

Referring to FIG. 5C, one exemplary embodiment of a multi-layer material 430 which may be useful in a radome application comprises a plurality of plies 462–466 which are coupled to each other. Plies 462–466 may be joined by stitching the plies together, laminating the plies together, powder bonding the plies together, and/or may be joined by some other method. The plies may be directly connected, or they may be indirectly connected by intervening materials.

Multi-layer material 460 may include a protective film 461 on a surface 468 of multi-layer material 460 which is facing the environment. Multi-layer material 460 may also have a protective film (not shown) located on an interior face 470. Further still, multi-layer material 460 may only have a film on interior face 470.

Protective film 461 may be designed to block UV light and may be designed to protect plies 462–466 from the penetration of environmental elements (such as water, sand/dirt, and others).

One or more of plies 462–466 may be individually stabilized and/or have a non-orthogonal orientation. Further, one of plies 462–466 may have a negative orientation and another may have a positive orientation.

Also, additional plies may be added to multi-layer material 460 or illustrated plies may be removed from multi-layer material 460. In some embodiments, multi-layer material 460 may be composed essentially of about two to about six plies.

Plies 426–466 may comprise yarns of any of the materials described with respect to block 200 (FIG. 3B). Typical yarns used to form radomes include aramids (such as KEVLAR), fiberglass, and/or polyester. The plies 462–466 may have warp yarns made of one material and fill yarns made of another material. Further, the yarns may comprise more than one type of material. Further still, each of plies 462–466 may have its own unique set of yarns.

Exemplary matrix materials for plies 462–466 include any of the matrix materials described above with respect to block 202 (FIG. 3B). A typical matrix material used to form a radome includes PTFE.

Multi-layer material 460 may be a flexible composite of the individual plies and matrix materials.

Other properties and characteristics of plies used in the construction of multi-layer materials used as radome covers can be determined with reference to FIGS. 1 to 4C above. Methods of forming radome covers may be seen with respect to FIGS. 3A to 3D above.

Belts

Referring to FIGS. 6A and 6B, an industrial machine 500 has a belt 502 and a driving mechanism 504. The driving mechanism 504 includes rollers 506, 508 which are coupled to motor 510. Belt 502 is stretched across rollers 506, 508 and may be placed under tension. If tension is applied to belt 502, the tension may result in deformation of the belt.

The belt may also tend to be deformed by the use of automatic tracking systems used to keep the belt aligned on the equipment. Further still, the belt may tend to be deformed by an uneven placement of loads on the belt.

These forces may be applied at angles that are not parallel or perpendicular to the direction of travel of the belt, and may not be adequately compensated for by the use of orthogonal plies with yarns running in a direction parallel to the intended direction of travel of the belt.

Multi-layer material 530 of belt 502 is preferably configured to resist shape deformation due to the tension, thermal cycling, thermal extremes and side to side stress to which it is subjected, and thereby retain better dimensional stability.

To compensate for these forces, the belt fabric may include plies with yarns which are non-perpendicular and non-parallel to the longitudinal direction of the belt. One example of such a ply would be a non-orthogonal ply with warp yarns that are perpendicular to the direction of travel of the belt (e.g. having fill yarns that are non-perpendicular and non-parallel to the longitudinal direction of the belt). A non-orthogonal construction may tend to more uniformity distribute and deflect loads, thereby mitigating or preventing some tracking problems.

Dimensional stability can be increased by specifically designing belts to resist deformation. One manner of doing this is designing a belt with layers having warp and fill yarns at different angles. The layers may also be made having different coatings. Using individually coated layers allows greater ability to design a belt with optimal properties, including increased dimensional stability.

Dimensional stability may be an issue for belts having an open weave since the warp yarns and fill yarns are not as densely packed. Such open weave belts are commonly classified as controlled porosity belts or open mesh belts. Controlled porosity belts tend to have a total amount of open area of greater than 0% and less than about 15%, and have porosities of about 5 to 50 SCFM. The current design may be more useful when directed to controlled porosity belts having a more open design, such as about 5% to about 15% open area. Open mesh belts, on the other hand, tend to have a total amount of open area greater than 10%, typically having an open area in the range of 10% to about 80%. In some embodiments, such open mesh belts will have a total amount of open area that is no less than about 30%. Also, in some embodiments, such open mesh belts will have a total amount of open area that is no more than about 60%.

Open weave designs including only orthogonal plies may tend to deform (narrow, ridge, and/or fold over) when pulled at certain angles or when exposed to thermal cycling. The addition of skewed plies adds strength at angles where orthogonal plies do not add strength, thereby improving the dimensional stability of the belt at those angles.

In one embodiment, the multi-layer material of the present application is not a closed porosity belt (e.g. does not have a total open area of about 0%).

Belt 502 may comprise a multi-layer material 520. Such a multi-layer material 520 may include plies that have warp yarns which are non-orthogonal to fill yarns. Use of such skewed plies may cause belt 502 to curl, ridge, or fold over. To counter the tendency to curl, ridge, or fold over, one or more orthogonal plies may be included in belt 502, preferably as the outer layers.

Open weave belts with improved dimensional stability may be useful in applications such as drying applications.

When designing a belt, it is advantageous to choose plies with properties which contribute to the dimensional stability, flex fatigue resistance, inter-ply adhesion, tear strength, tracking, belt elongation, thermal cycling, and use temperature of the belt. The orientation of the plies of the fabric of the belt primarily contributes to the dimensional stability of the belt.

Referring to FIG. 6B, one exemplary embodiment of a multi-layer material 520 which may be useful in a belt application comprises a plurality of plies 522–528 which are coupled to each other. Plies 522–528 may be joined by stitching the plies together, laminating the plies together, powder bonding the plies together, or may be joined by some other method. The plies may be directly connected, or they may be indirectly connected together by intervening materials.

One or more of plies 522–528 may be individually stabilized and/or have a non-orthogonal orientation. Further, one of plies 522–528 may have a negative orientation and another may have a positive orientation.

Multi-layer material 520 may include a protective film (not shown) on a face 550 of multi-layer material 520. Multi-layer material 520 may also have a protective film (not shown) located on a face 552 of multi-layer material 520 opposite from face 550. Further still, multi-layer material 520 may only have a film on face 552.

Also, additional plies may be added to multi-layer material 520 or illustrated plies may be removed from multi-layer material 520. In some embodiments, multi-layer material 520 may be composed essentially of about three to about six plies.

Additionally, multi-layer material 520 may include flights (not shown) integral with multi-layer material 520. Flights may include ribs, cleats, ridges, lugs, or other protuberances. The flights may be located on either or both of surfaces 550 and 552. The flights may be continuous or discontinuous. The flights may be located transverse to the direction of travel of the belt (e.g. to prevent items from slipping) or may extend parallel to the direction of the belt (e.g. to prevent the belt from weaving from side to side). If flights are on both faces of multi-layer material 520, the flights may extend in the same direction (such as for use in contact toasters) or may extend in different directions (e.g. parallel flights on the bottom face of the belt to prevent weaving and transverse flights on the top of the belt to prevent slippage).

Plies 522–528 may comprise yarns of any of the materials described with respect to block 200 (FIG. 3B). The type of yarn that is commonly used for a particular belt depends on the application for which the belt is being used. For example, a belt designed to be used in a high temperature application may include yarns comprising fiberglass, an aramid such as KEVLAR or NOMEX®, some other high temperature yarn, or yarns comprised of combinations of these materials. As another example, open mesh belts used in drying applications commonly include yarns comprised of fiberglass/ NOMEX®, Glass/KEVLAR®, NOMEX®/KEVLAR® or combinations thereof. The plies 522–528 may have warp yarns made of one material and fill yarns made of another material. Further, the yarns may be comprised of combinations of materials. Further still, each of plies 522–528 may have its own unique set of yarns.

Exemplary matrix materials for plies 522–528 include any of the matrix materials described above with respect to block 202 (FIG. 3B). Again, the type of matrix material that is commonly used for a particular belt depends on the application for which the belt is being used. For example, a belt designed to be used in a high temperature application where a low coefficient of friction is needed may use a matrix material comprising a fluoropolymer such as PTFE or some other material meeting these standards. As another example, open mesh belts used in drying applications commonly include matrix materials comprising silicone rubber and/or PTFE. A belt for use in a high temperature cooking application may comprise a silicone rubber matrix material.

Multi-layer material 520 may be a flexible composite of the individual plies and matrix materials.

Other properties and characteristics of plies used in the construction of multi-layer materials used as belts can be determined with reference to FIGS. 1 to 4C above. One method of using a belt according to one embodiment may be seen with respect to FIG. 3E above.

Architectural Fabrics

Referring to FIGS. 7A–7C, a structure 600 includes walls 601, 602 and roof 604. Roof 604 includes support beams 606 and a multi-layer material 608 which is supported by support beams 606. Alternatively, roof 604 could include some type of support mechanism other than support beams 606 such as cabling and/or air pressure. Multi-layer material 608 is preferably designed to allow light to shine through, but not allow other environmental elements, such as dust and water, to pass through. Some examples of structures 600 that use a high performance fabric as a roof material include sports stadiums (such as the Minneapolis Metrodome) and airports (such as Denver International Airport). Forming the roof material from individually coated layers allows greater flexibility when designing a roof with optimal properties.

Multi-layer material 608 is preferably designed to be at least partially light transmissive. The term "translucent" will be used to refer to the light transmissivity and will refer to both translucent and transparent materials unless stated otherwise in a claim at issue. Some embodiments of multi-layer material 608 have an overall light transmissivity of at least about at 5. Some of these embodiments have an overall light transmissivity of at least about 20%. Some embodiments have an overall light transmissivity of no more than about 5%. Some of these embodiments have an overall light transmissivty of no more than about 45%.

One material which may be suitable for allowing light transmission is glass fibers and polyester/nylon. These materials may be coated with polytetrafluroethylene (PTFE), poly vinyl chloride (PVC) and/or liquid silicone rubber (LSR) or some other form of silicone rubber.

Architectural fabrics may be classified between permanent structures and movable structures. While usable for both types of structures, multi-layer material 608 formed as disclosed in this application tends to be more applicable to permanent structures. More particularly, such multi-layer materials may be useful for forming roofs or skylights for permanent structures like domes and airports.

Referring to FIG. 7C, one exemplary embodiment of a multi-layer material 640 which may be useful in an architectural application (especially for a permanent structure) comprises a plurality of plies 644–648 which are coupled to each other. Plies 644–648 may be joined by stitching the plies together, laminating the plies together, powder bonding the plies together, or may be joined by some other method. The plies may be directly connected, or they may be indirectly connected together by intervening materials.

One or more of plies 644–648 may be individually stabilized and/or have a non-orthogonal orientation. Further, one of plies 644–648 may have a negative orientation and another may have a positive orientation.

Multi-layer material 640 may include a protective film 642 on an external face 660 of multi-layer material 640 facing the environment. Multi-layer material 640 may also have a protective film (not shown) located on a face 662 of multi-layer material 640 exposed to the interior of the structure. Multi-layer material 640 generally does not have a protective layer on interior face 662 without also having a protective layer on external face 660 in products intended for use as roofing and skylight materials.

The protective layer 642 is generally chosen to be translucent and may be clear, tinted, or some combination of clear and tinted. A suitable tint for a protective layer 642 of a material 640 configured to be used as a roofing or skylight material is a blue tint. Protective layer 642 may be used to make multi-layer material 640 waterproof and may be used to protect the yarns of the plies 644–648 from environmental elements. Protective layer 642 may include pigments which may impart color for architectural decorative effect.

Protective layer 644 may include a fluoropolymer which may protect the composite from rain, aid in shedding snow more easily, and/or provide a self-cleaning surface.

Also, additional plies may be added to multi-layer material 640 or illustrated plies may be removed from multi-layer material 640. In some embodiments, multi-layer material 640 may be composed essentially of about two to about five plies.

Plies 644–648 may comprise yarns of any of the materials described with respect to block 200 (FIG. 3B). The type of yarn that is commonly used for architectural fabrics depends on the application in which the fabric is being used. For example, when the fabric is used as a roofing or skylight material of a structure (and particularly for permanent structures), common yarn materials include polyester, nylon, KEVLAR, and/or fiberglass. The plies 644–648 may have warp yarns made of one material and fill yarns made of another material. Further, the yarns may be comprised of combinations of these materials. Further still, each of plies 644–648 may have its own unique set of yarns.

Exemplary matrix materials for plies 644–648 include any of the matrix materials described above with respect to block 202 (FIG. 3B). The type of matrix material that is commonly used for architectural fabrics depends on the application in which the fabric is being used. For example, when the fabric is used as a roofing or skylight material of a structure (and particularly for permanent structures), common matrix materials include PTFE, PVC, and silicone rubber.

Multi-layer material 640 may be a flexible composite of the individual plies and matrix materials.

Other properties and characteristics of plies used in the construction of multi-layer materials for use as architectural fabrics can be determined with reference to FIGS. 1 to 4C above. Methods of forming architectural fabrics may be seen with respect to FIG. 3A above.

Expansion Joints

Referring to FIG. 8A, an industrial system 700 includes a first rigid conduit 710 coupled to a second rigid conduit 712 by an expansion joint 714. Expansion joint 714 is connected to first conduit 710 by first connectors 718 (which may comprise bolts) and to second conduit 712 by second connectors 719. Industrial system 700 may also include bars 716 extending between first conduit 710 and second conduit 712. Expansion joint 714 may be comprised of a multi-layer material 730 (FIG. 8B).

Extending between may mean that the extending item extends from one conduit to the other, may mean that a portion of the item extends in the length between the two conduits, may mean that the entire extending item is located in a space between the conduits (whether directly connected or not), or may include other positions consistent with the ordinary meaning of the term.

Expansion joint 714 may have a bellow-like shape. Expansion joint 714 may be used to span the gap between two gas stream containments (e.g. smoke stack and power generation plant). Alternately, expansion joint 714 may be used to fabricate chutes in a chemical plants. Expansion joint 714 could also be used for other purposes.

When designing expansion joints, it is advantageous to design a multi-layer material 730 with plies that contribute to the tensile strength, tear strength, flex fatigue resistance, inter-ply adhesion, and use temperature of the expansion joint. The orientation of the plies may contribute to the ability to uniformly distribute loads as well as prevent tear migration by deflecting the direction of the stress.

Referring to FIG. 8B, one exemplary embodiment of a multi-layer material 730 which may be useful in an expansion joint application comprises a plurality of layers 740–746 which are coupled to each other. Plies 740–744 may be joined by stitching the plies together, laminating the plies together, powder bonding the plies together, and/or may be joined by some other method. The plies may be directly connected, or they may be indirectly connected together by intervening materials.

Multi-layer material 730 may include a protective film 746 on a surface 734 of multi-layer material 730 which is facing an interior of the expansion joint 716. Protective film 746 may be configured to protect the remainder of multi-layer material 730 from the articles being transported through conduits 710, 712 (FIG. 8A). For instance, the material in the ducts of a powerplant may include fine particles ("ash") as well as hot corrosives. Film 746 may include polytetrafluoroethylene (PTFE), or other fluropolymers films including but not limited to perfluoroalkoxy (PFA) and fluorinated ethylene-propylene (FEP). Also, in some embodiments film 746 may be selected to have a thickness that is at least about 0.002 inches and/or may be selected to have a thickness that is no more than about 0.1 inches.

One or more of plies 740–744 may be individually stabilized and have a non-orthogonal orientation. Further, one or more of plies 740–744 may have a negative orientation and one or more may have a positive orientation.

Also, additional plies may be added to multi-layer material 730 or illustrated plies may be removed from multi-layer material 730. In some embodiments, multi-layer material 730 may be composed essentially of about two to about five plies.

Plies 740–744 may comprise yarns of any of the materials described with respect to block 200 (FIG. 3B). Typical yarns used to form expansion joints include fiberglass, NOMEX®& KEVLAR®. The plies 740–744 may have warp yarns made of one material and fill yarns made of another material. Further, each of plies 740–744 may have its own unique set of yarns. The yarns may also be hybrid; consisting of one yarn plied of several different fibers (e.g. glass, NOMEX®, KEVLAR®) in one or both directions.

Exemplary matrix materials for plies 740–744 include any of the matrix materials described above with respect to block 202 (FIG. 3B). Typical matrix materials used to form expansion joints include PTFE, FEP & PFA along with a fluroelastomer.

Multi-layer material 730 may be a flexible composite of the individual plies and matrix materials.

Other properties and characteristics of plies used in the construction of mult-layer materials used as expansion joints can be determined with reference to FIGS. 1 to 4C above.

EXAMPLES

The following example is presented to illustrate the present invention and to assist one of ordinary skill in making and using the same. The examples are not intended in any way to otherwise limit the scope of the invention.

Example 1

| Layer Number | Warp Yarn Material | Fill Yarn Material | Matrix Material | Orientation | Structural Yarns |
|---|---|---|---|---|---|
| 1 | Kevlar | Kevlar | PTFE | Orthogonal | Warp, Fill |
| 2 | Kevlar | Kevlar | PTFE | −60° | Fill |
| 3 | Kevlar | Kevlar | PTFE | +60° | Fill |

According to this exemplary embodiment, which may be useful for a radome, a multi-layer material 460 (FIG. 5C) includes a first ply 462 with an orthogonal orientation, a second ply 464 with a negative orientation, and a third ply 466 with a positive orientation. First ply 462, second ply 464, and third ply 466 comprise KEVLAR warp and fill yarns woven together and coated with PTFE. Second ply 464 and third ply 466 have 60 degree skew angles, and have fill yarns that are structural and warp yarns that are non-structural. When formed as multi-layer material 430, the warp yarns of first ply 462, second ply 464, and third ply 466 extend in about the same (parallel) direction. Plies 462–466 are laminated together using technology such as that disclosed in U.S. Pat. No. 5,141,800. Alternatively, plies 462–466 may be stitched together using threads.

Multi-layer material 430 has a first face 468 extending towards the outside environment and a second face 470 facing the interior of radome 406. The two skew plies 464, 466 are located towards interior face 470 and the orthogonal ply 462 is located towards exterior face 468.

A protective layer 461 is applied to first ply 462 as a barrier between the plies and the environment. Protective layer 461 may include a UV blocking film which includes PTFE, TiO2, and carbon black. One such UV blocking film is sold by Saint-Gobain Performance Plastics under the name CHEMFILM™.

Example 2

| Layer Number | Warp Yarn Material | Fill Yarn Material | Matrix Material | Orientation | Structural Yarns |
|---|---|---|---|---|---|
| 1 | Kevlar | Kevlar | PTFE | Orthogonal | Warp, Fill |
| 2 | Kevlar | Kevlar | PTFE | −45° | Fill |
| 3 | Kevlar | Kevlar | PTFE | +45° | Fill |

According to this exemplary embodiment, which may be useful for a radome, a multi-layer material 460 (FIG. 5C) includes a first ply 462 with an orthogonal orientation, a second ply 464 with a negative orientation, and a third ply 466 with a positive orientation. First ply 462, second ply 464, and third ply 466 comprise KEVLAR warp and fill yarns woven together and coated with PTFE. Second ply 464 and third ply 466 have 45 degree skew angles, and have fill yarns that are structural and warp yarns that are non-structural. When formed as multi-layer material 430, the warp yarns of first ply 462, second ply 464, and third ply 466 extend in about the same direction. Plies 462–466 are laminated together using technology such as that disclosed in U.S. Pat. No. 5,141,800. Alternatively, plies 462–466 may be stitched together using threads.

Multi-layer material 430 has a first face 468 extending towards the outside environment and a second face 470 facing the interior of radome 406. The two skew plies 464, 466 are located towards interior face 470 and the orthogonal ply 462 is located towards exterior face 468.

A protective layer 461 is applied to first ply 462 as a barrier between the plies and the environment. Protective layer 461 includes a UV blocking film which may include PTFE, TiO2, and carbon black. One such UV blocking film is sold by Saint-Gobain Performance Plastics under the name CHEMFILM™.

Example 3

| Layer Number | Warp Yarn Material | Fill Yarn Material | Matrix Material | Orientation | Structural Yarns |
|---|---|---|---|---|---|
| 1 | Kevlar | Kevlar | PTFE | Orthogonal | Warp, Fill |
| 2 | Kevlar | Kevlar | PTFE | −30° | Fill |
| 3 | Kevlar | Kevlar | PTFE | +60° | Fill |
| 4 | Kevlar | Kevlar | PTFE | −60° | Fill |
| 5 | Kevlar | Kevlar | PTFE | +30° | Fill |

According to this exemplary embodiment, which may be useful for a radome, a multi-layer material 460 (FIG. 5C) includes a first ply 462 with an orthogonal orientation, a second ply 464 and a fourth ply (not shown) with negative orientations, and a third ply 466 and a fifth ply (not shown) with positive orientations. First ply 462, second ply 464, third ply 466, the fourth ply, and the fifth ply comprise KEVLAR warp and fill yarns woven together and coated with PTFE. Third ply 466 and the fourth ply have 60 degree skew angles, and have fill yarns that are structural and warp yarns that are non-structural. Second ply 464 and the fifth ply have 30 degree skew angles, and have fill yarns that are structural and warp yarns that are non-structural. When formed as multi-layer material 430, the warp yarns of first ply 462, second ply 464, third ply 466, the fourth ply and the fifth ply extend in about the same direction. The five plies are laminated together using technology such as that disclosed in U.S. Pat. No. 5,141,800. Alternatively, the plies may be stitched together using threads.

Multi-layer material 430 has a first face 468 extending towards the outside environment and a second face 470 facing the interior of radome 406. The two skew plies 464, 466 are located towards interior face 470 and the orthogonal ply 462 is located towards exterior face 468.

A protective layer 461 is applied to first ply 462 as a barrier between the plies and the environment. Protective layer 461 includes a UV blocking film which may include PTFE, TiO2, and carbon black. One such UV blocking film is sold by Saint-Gobain Performance Plastics under the name CHEMFILM™.

Example 4

| Layer Number | Warp Yarn Material | Fill Yarn Material | Matrix Material | Orientation | Structural Yarns |
|---|---|---|---|---|---|
| 1 | Kevlar | Kevlar | PTFE | −60° | Fill, Warp |
| 2 | Kevlar | Kevlar | PTFE | +60° | Fill, Warp |

According to this exemplary embodiment, which may be useful for a radome, a multi-layer material 460 (FIG. 5C) includes a first ply 462 with a negative orientation, and a second ply 464 with a positive orientation. First ply 462 and second ply 464 comprise KEVLAR warp and fill yarns woven together and coated with PTFE. First ply 462 and second ply 464 have 60 degree skew angles, and have fill yarns that are structural. Plies 462 and 464 also have warp yarns which each bear about 50% of a structural load. When formed as multi-layer material 430, the warp yarns of first ply 462 and second ply 464 extend in about the same direction. Plies 462, 464 are laminated together using technology such as that disclosed in U.S. Pat. No. 5,141,800. Alternatively, plies 462, 464 may be stitched together using threads.

A protective layer 461 is applied to first ply 462 as a barrier between the plies and the environment. Protective layer 461 includes a UV blocking film which may include PTFE, TiO2, and carbon black. One such UV blocking film is sold by Saint-Gobain Performance Plastics under the name CHEMFILM™.

Example 5

| Layer Number | Warp Yarn Material | Fill Yarn Material | Matrix Material | Orientation | Structural Yarns |
|---|---|---|---|---|---|
| 1 | Kevlar | Kevlar | PTFE | −45° | Fill, Warp |
| 2 | Kevlar | Kevlar | PTFE | +45° | Fill, Warp |

According to this exemplary embodiment, which may be useful for a radome, a multi-layer material 460 (FIG. 5C) includes a first ply 462 with a negative orientation, and a second ply 464 with a positive orientation. First ply 462 and second ply 464 comprise KEVLAR warp and fill yarns woven together and coated with PTFE. First ply 462 and second ply 464 have 45 degree skew angles, and have fill yarns that are structural. Plies 462 and 464 also have warp yarns which are structural and each bear about 50% of a structural load along a common axis. When formed as multi-layer material 430, the warp yarns of first ply 462 and second ply 464 extend in about the same direction. Plies 462, 464 are laminated together using technology such as that disclosed in U.S. Pat. No. 5,141,800. Alternatively, plies 462, 464 may be stitched together using threads.

A protective layer 461 is applied to first ply 462 as a barrier between the plies and the environment. Protective layer 461 includes a UV blocking film which may include PTFE, TiO2, and carbon black. One such UV blocking film is sold by Saint-Gobain Performance Plastics under the name CHEMFILM™.

Example 6

| Layer Number | Warp Yarn Material | Fill Yarn Material | Matrix Material | Orientation | Porosity |
|---|---|---|---|---|---|
| 1 | Fiberglass | Fiberglass | PTFE | Orthogonal | Open Mesh |
| 2 | Fiberglass | Fiberglass | PTFE | +45° | Open Mesh |
| 3 | Fiberglass | Fiberglass | PTFE | −45° | Open Mesh |
| 4 | Fiberglass | Fiberglass | PTFE | Orthogonal | Open Mesh |

According to this exemplary embodiment, which may be useful for a belt, a multi-layer material 520 (FIG. 6B) includes a first ply 522 with an orthogonal orientation, a second ply 524 with a positive orientation, a third ply 526 with a negative orientation, and a fourth ply with an orthogonal orientation. First ply 522, second ply 524, third ply 526, and fourth ply 528 comprise fiberglass warp and fill yarns woven together and coated with PTFE. Second ply 524 and third ply 526 have 45 degree skew angles. When formed as multi-layer material 520, the warp yarns of first ply 522, second ply 524, third ply 526, and fourth ply 528 extend in about the same direction. Plies 522–528 are stitched together using polyester or KEVLAR threads.

Multi-layer material 520 has a first face 550 facing in a first direction and a second face 552 facing in a second direction. Multi-layer material 520 is substantially planar. First face 550 is configured to carry articles on the belt and second face 552 is configured to face opposite the articles. The two skew plies 524, 526 are located in the middle of the multi-layer fabric and the orthogonal plies 522, 528 are located towards the faces 550, 552 of the belt.

Example 7

| Layer Number | Warp Yarn Material | Fill Yarn Material | Matrix Material | Orientation |
|---|---|---|---|---|
| 1 | Fiberglass | Fiberglass | Silicone Rubber | +45° |
| 2 | Fiberglass | Fiberglass | Silicone Rubber | −45° |
| 3 | Fiberglass | Fiberglass | Silicone Rubber | Orthogonal |

According to this exemplary embodiment, which may be useful for an architectural roof fabric, a multi-layer material 640 (FIG. 7C) includes a first ply 644 with a positive orientation, a second ply 646 with a negative orientation, and a third ply 648 with an orthogonal orientation. First ply 644, second ply 646, and third ply 648 comprise fiberglass warp and fill yarns woven together and coated with silicone rubber. First ply 644 and second ply 646 have 45 degree skew angles. When formed as multi-layer material 640, the warp yarns of first ply 644, second ply 646, and third ply 648 extend in about the same direction. Plies 644–648 are stitched together using polyester threads.

Multi-layer material 640 has a first face 660 extending towards the outside environment and a second face 662 facing the interior of the building for which the roof fabric 640 is being used. The two skew plies 644, 646 are located towards exterior face 660 and the orthogonal ply 648 is located towards interior face 662.

A protective layer 642 is applied to first ply 644 as a barrier between the plies and the environment. Protective layer 642 includes a fluoropolymer.

Example 8

| Layer Number | Warp Yarn Material | Fill Yarn Material | Matrix Material | Orientation |
|---|---|---|---|---|
| 1 | Fiberglass | Fiberglass | PTFE/FE blend | Orthogonal |
| 2 | Fiberglass | Fiberglass | PTFE/FE blend | +45° |
| 3 | Fiberglass | Fiberglass | PTFE/FE blend | −45° |

According to this exemplary embodiment, which may be useful for an expansion joint, a multi-layer material 730 (FIG. 8B) includes a first ply 740 with an orthogonal orientation, a second ply 742 with a positive orientation, and a third ply 744 with a negative orientation. First ply 740, second ply 742, and third ply 744 fiberglass warp and fill yarns woven together and coated so that the Fluoroelastomer in the blend remains uncured. Second ply 742 and third ply 744 have orientations of 45 degrees. When formed as multi-layer material 730, the warp yarns of first ply 740, second ply 742, and third ply 744 extend in about the same direction. Plies 740–744 are joined together by stitching.

Multi-layer material 730 has a first face 732 extending towards the outside environment and a second face 734 facing the interior of the cylindrical or box-shaped expansion joint 716 (FIG. 8A). The two skew plies 742, 744 are located towards interior face 734 and the orthogonal ply 740 is located towards exterior face 732.

A protective layer 746 is applied to third ply 746 as a barrier between the plies and the material to be transported through expansion joint 716. Protective layer 746 includes PTFE.

Example 9

| Property | Units | Value |
|---|---|---|
| Weight | oz./sq. yd. | 80 ± 3 |
| Thickness | inches | 0.080 nominal |
| Strip Tensile Strength | lbs./in. | |
| Warp (Dry) | | 1800 min average |
| Fill (Dry) | | 1800 min average |
| D 1 (Dry) | | 1800 min average |
| D 2 (Dry) | | 1800 min average |
| Strip Tensile Strength After 50 lbs Creasefold | lbs./in. | |
| Warp (Dry) | | 1750 min average |
| Fill (Dry) | | 1750 min average |
| D 1 (Dry) | | 1750 min average |
| D 2 (Dry) | | 1750 min average |
| Tear Strength (Trapezoidal) | lbs. | |
| Warp | | 700 min average |
| Fill | | 700 min average |
| Seam Peel Adhesion | lbs./in. | |
| Dry | | 20 min average |
| Wet | | 20 min average |
| Uniaxial Elongation (at 40 lbs./in.) | % | |
| Warp | | 2.5 max average |
| Fill | | 2.0 to 5.5 average |

-continued

| Property | Units | Value |
| --- | --- | --- |
| Dielectric Constant | | 2.35 nominal |
| Loss Tangent | | 0.006 nominal |
| Water Absorption | % | Less than 2 |
| Hydrophobic Contact Angle | degrees | 90 + nominal |
| Incombustibility | seconds | 0 to flameout |
| Service Temperature | degrees F. | −60 to 500 |

A radome cover made of a fabric which uses plies having non-orthogonally oriented plies according to one example has the above-listed physical and performance properties. The fabric is a multi-ply fabric where the plies are comprised of PTFE coated KEVLAR and a film is located on the outer surface of the fabric. The radome is designed to be RF transmissive with good performance at multiple frequencies.

The exemplary fabric's quadriaxial, multi-ply, laminated construction provides good dimensional stability, even in the most extreme environments. The composite offers durable hydrophobicity, enhanced flexural characteristics, very high tear strength, and good high temperature/fire performance.

Example 10

| Property | Units | Value |
| --- | --- | --- |
| Weight | oz./sq. yd. | 70 ± 3 |
| Thickness | inches | 0.070 nominal |
| Strip Tensile Strength | lbs./in. | |
| Warp (Dry) | | 1200 min average |
| Fill (Dry) | | 1200 min average |
| D 1 (Dry) | | 1200 min average |
| D 2 (Dry) | | 1200 min average |
| Strip Tensile Strength After 50 lbs Creasefold | lbs./in. | |
| Warp (Dry) | | 1150 min average |
| Fill (Dry) | | 1150 min average |
| D 1 (Dry) | | 1150 min average |
| D 2 (Dry) | | 1150 min average |
| Tear Strength (Trapezoidal) | lbs. | |
| Warp | | 500 min average |
| Fill | | 500 min average |
| Seam Peel Adhesion | lbs./in. | |
| Dry | | 20 min average |
| Wet | | 20 min average |
| Uniaxial Elongation (at 40 lbs./in.) | % | |
| Warp | | 2.5 max average |
| Fill | | 2.5 to 5.5 average |
| Dielectric Constant | | 2.35 nominal |
| Loss Tangent | | 0.005 nominal |
| Water Absorption | % | Less than 2 |
| Hydrophobic Contact Angle | degrees | 90 + nominal |
| Incombustibility | seconds | 0 to flameout |
| Service Temperature | degrees F | −60 to 500 |

A radome cover made of a fabric which uses plies having non-orthogonally oriented plies according to one example has the above-listed physical and performance properties. The fabric is a multi-ply fabric where the plies are comprised of PTFE coated KEVLAR and a film is located on the outer surface of the fabric. The radome is designed to be RF transmissive with good performance at multiple frequencies.

The exemplary fabric's quadriaxial, multi-ply, laminated construction provides good dimensional stability, even in the most extreme environments. The composite offers durable hydrophobicity, enhanced flexural characteristics, very high tear strength, and good high temperature/fire performance.

Example 11

A woven fabric with a count of 8×12, warp yarns of 1000d KEVLAR and fill yarns of 3000 denier KEVLAR, is dipped at 4 fpm through a Silicone/PTFE formulation at 1.32 sg (43.4% solids). It is then dried and baked for 90 seconds at 300 F and 515 F respectively.

The yarns of this woven material are subsequently reoriented on equipment depicted in FIG. 4. The payout of this equipment is angled at 45 degrees to the web path. All of the other rolls are at 90 degrees to the web path. Reorientation is done at 3 fpm without adding new coating.

Example 12

A woven fabric with a count of 8×12, warp yarns of 1000d KEVLAR and fill yarns of 3000 denier KEVLAR, is dipped at 4 fpm through a Silicone/PTFE formulation at 1.32 sg (43.4% solids). It is then dried and baked for 90 seconds at 300 F and 515 F respectively.

The yarns of this woven material are subsequently reoriented on equipment depicted in FIG. 4. The payout is angled at 45 degrees to the web path. All of the other rolls are at 90 degrees to the web path. Reorientation is done at 3 fpm. While the reorientation is occurring, the fabric is dipped through a PTFE dispersion at 1.50 sg (59.5% solids). It is then dried and baked for 120 seconds at 220 F and 630 F respectively.

The fabric is given a third coating. 1.50 sg PTFE dispersion (59.5%) is applied at 3 fpm, then dried and baked for 120 seconds at 220 F and 630 F respectively.

Example 13

This ply consists of a 26×26 count basket weave using 2000 denier KEVLAR yarn in both warp and fill. It is coated with a silicone/PTFE formulation at 1.32 sg, 4 fpm, drying and baking for 90 seconds at 300 F and 515 F respectively.

Example 14

The coated fabrics described in examples 11 and 12 are stitched to the fabric described in example 13. These three plies are arranged in an order of example 13, then example 12, and then example 11 and are stitched together using KEVLAR 46 Natural stitching thread (Synthetic Fibers) at 4.5 gauge chain stitch with 4.5 to 7.7 stitches per inch.

The stitched composite is further coated with 42 osy of PTFE. Each PTFE coating pass is dried and baked (2 minutes at 250 F and 555 F respectively). The coated fabric is then sintered for 80 seconds at 750 F and then coated with 15 osy of a PTFE/TiO2 formulation and finished with a 2 osy topcoat of FEP dispersion. Each of these passes is dried, baked and sintered for 120 seconds.

The properties of this product are:

| Breaking strength | |
| --- | --- |
| Warp | 1317 pli |
| Fill | 1091 pli |
| Diagonal 1 | 1093 pli |
| Diagonal 2 | 759 pli |

-continued

| Trap. Tear | |
|---|---|
| Warp | 766 lbs |
| Fill | 946 lbs |
| Diagonal 1 | 733 lbs |
| Diagonal 2 | 811 lbs |
| Crease Fold | |
| Warp | 1270 pli |
| Fill | 1142 pli |
| Diagonal 1 | 984 pli |
| Diagonal 2 | 774 pli |
| Seam Strength | |
| Warp | 1147 pli |
| Fill | 1107 pli |
| Diagonal 1 | 915 pli |
| Diagonal 2 | 673 pli |

Example 15

A woven KEVLAR fabric with a count of 10×17.5 ypi with 1140 Denier KEVLAR 49 yarn is reoriented on equipment shown in FIG. 4. The accumulator rolls are angled 15 degrees from the cross machine direction (75 degrees from the web path). At about the same time it is coated with a PTFE/PFA formulation containing 5% by weight PFA based on solids. It is dried and sintered for 90 seconds at 300 F and 680 F respectively. The reoriented fabric is dipped through 1.45 sg PTFE two more times, dried and baked for 90 seconds at 300 F and 580 F respectively after each dip.

Example 16

Two layers of material made in example 4 are laid up so that the warp yarns of one ply run parallel to the warp yarns of the other and the fill yarns are at +30 in one ply and −30 in the other ply. A third layer consisting of cast PTFE film with TiO2 as a UV block placed on one face and the three layers (film and two fabrics) are laminated together using a B. F. Perkins 100", 100 Ton, 3 Roll Calendar the 4 fpm with 1750 psig hydraulic pressure (≈2000 lbs/in.). The tacked laminate is then sintered for 120 seconds at 750 F.

The invention has been described with reference to various specific and illustrative and exemplary embodiments and techniques. However, it should be understood that many variations and modifications may be made while remaining within the spirit and scope of the invention. Also, while individually coated plies made according to the above description are particularly useful for forming antenna covers, industrial belts, structural materials, and expansion joints, the plies may also be used to advantageously design multi-ply materials intended for other uses. Also, while reference has been made in the specification to a multi-layer material, in each case it is contemplated that the multi-layer material could be a multi-ply fabric where two or more of the layers are made of plies of fabric. The description in this application is even more specifically believed to be useful for multi-layer materials that can be classified as multi-ply woven fabrics where two or more of the plies are formed by a weaving process.

The invention claimed is:

1. A flexible composite, comprising:
a woven ply comprising a non-orthogonal orientation;
a second woven ply;
wherein the woven ply is individually stabilized by a stabilizing agent;
wherein the flexible composite is configured to be a component of a a radome cover; and
a third woven ply comprising an orthogonal orientation.

2. A flexible composite, comprising:
a woven ply comprising a non-orthogonal orientation;
a second woven ply:
a third woven ply;
wherein the woven ply is individually stabilized by a stabilizing agent;
wherein the flexible composite is configured to be a component of a flexible assembly and the flexible assembly is a radome cover;
wherein the woven ply comprises a positive non-orthogonal orientation the second woven ply comprises a negative non-orthogonal orientation and the third woven ply comprises an orthogonal orientation.

3. The flexible composite of claim 2, wherein the stabilizing agent comprises a material selected from a group consisting of a silicone rubber, a urethane rubber, a urethane, a polyurethane, a polyvinyl chloride, a polyvinylidene chloride, a polyvinyl alcohol, a fluoropolymer, and combinations thereof.

4. The flexible composite of claim 2, further comprising a protective film.

5. The flexible composite of claim 2, wherein the radome cover has a tri-axial configuration.

6. The flexible composite of claim 2, wherein the radome cover comprises a trapezoidal tear strength of at least about 300 pounds.

7. The flexible composite of claim 2, wherein the radome cover is configured to have good RF performance at multiple frequencies.

8. The flexible composite of claim 2, wherein the radome cover is configured to be air-supported.

9. The flexible composite of claim 2, wherein the flexible assembly is a belt.

10. The flexible composite of claim 9, wherein the belt further comprises flights extending from a face of the flexible composite.

11. The flexible composite of claim 9, wherein the belt is an open weave belt.

12. The flexible composite of claim 2, wherein the flexible assembly is an architectural fabric.

13. The flexible composite of claim 11, wherein the architectural fabric comprises at least one of a flexible roof fabric comprising the flexible composite and a skylight comprising the flexible composite.

14. The flexible composite of claim 2, wherein the flexible composite is translucent.

15. The flexible composite of claim 2, wherein the flexible assembly is an expansion joint.

16. The flexible composite of claim 2, further comprising a fluoropolymer film disposed on an interior face of the flexible composite.

17. The flexible composite of claim 2, wherein each of the non-orthogonal orientations comprise a skew angle of about 30 degrees to about 60 degrees.

18. The flexible composite of claim 17, wherein the non-orthogonal orientation comprises a skew angle of up to about 50 degrees.

19. The flexible composite of claim 2, wherein the flexible composite is up to about 0.1 inches thick.

20. The flexible composite of claim 19, wherein the flexible composite is at least about 0.04 inches thick.

21. The flexible composite of claim 2, wherein the flexible composite has a weight of up to about 100 osy.

22. The flexible composite of claim 2, wherein the flexible composite comprises structural yarns at even increments.

23. The flexible composite of claim 2, wherein the multi-ply composite contributes to a loss of signal of less than about 0.5 percent at multiple frequencies.

24. An assembly comprising:
a flexible article including a woven ply, the woven ply comprising a positive non-orthogonal orientation;
a second woven ply comprising a negative non-orthogonal orientation
a third woven ply comprising an orthogonal orientation; and
wherein the flexible article is selected from a group consisting of a radome cover, a belt, an architectural fabric, and an expansion joint.

25. The assembly of claim 24, wherein the flexible article is a radome cover.

26. The assembly of claim 25, wherein the radome cover has a tri-axial configuration.

27. The assembly of claim 25, wherein the radome cover comprises a trapezoidal tear strength of at least about 300 lbs.

28. The assembly of claim 25, wherein the radome cover is configured to be air-supported.

29. The assembly of claim 24, wherein the flexible article is a belt.

30. The assembly of claim 29, further comprising a fourth woven ply comprising an orthogonal orientation.

31. The assembly of claim 29, wherein the belt further comprises flights extending from a face of the belt.

32. The assembly of claim 24, wherein the flexible article is at least one of an architectural roof fabric and a skylight.

33. The assembly of claim 24, wherein the flexible composite is translucent.

34. The assembly of claim 24, wherein the flexible article is an expansion joint.

35. The assembly of claim 34, further comprising a fluoropolymer film disposed on an interior face of the expansion joint.

36. A radome, comprising:
a first woven ply comprising a first non-orthogonal orientation, the first woven ply being individually stabilized by a first stabilizing agent,
the first stabilizing agent comprising an agent selected from a group consisting of silicone rubber, urethane rubber, urethane, polyurethane, polyvinyl chloride, polyvinylidene chloride, polyvinyl alcohol, and their copolymers with acrylic acid or acrylic acid esters or other vinyl ester monomers, fluoropolymers, fluoroelastomers, and combinations thereof;
the first woven ply comprising yarns comprising fibers selected from a group consisting of aramids, fiberglass, polyester, and combinations thereof;
the first non-orthogonal orientation being a positive non-orthogonal orientation and having a skew angle of about 30 degrees to about 60 degrees;
a second woven ply comprising a second non-orthogonal orientation, the second woven ply being individually stabilized by a stabilizing agent;
the second stabilizing agent comprising an agent selected from a group consisting of silicone rubber, urethane rubber, urethane, polyurethane, polyvinyl chloride, polyvinylidene chloride, polyvinyl alcohol, and their copolymers with acrylic acid or acrylic acid esters or other vinyl ester monomers, fluoropolymers, fluoroelastomers, and combinations thereof;
the second woven ply comprising yarns comprising fibers selected from a group consisting of aramids, fiberglass, polyester, and combinations thereof;
the second non-orthogonal orientation being a negative non-orthogonal orientation and having a skew angle of about 30 degrees to about 60 degrees;
a third ply having an orthogonal orientation;
wherein the radome is a flexible, air-supported radome;
wherein the first woven ply and second woven ply are part of a multi-axial material, the multi-axial material having a thickness of up to about 0.3 inches; and
wherein the radome contributes to a signal loss of no more than about 0.5% of a signal strength at least one frequency used by radars.

37. The radome cover of claim 36, wherein the flexible radome cover has a trapezoidal tear strength of at least about 400 pounds in at least three directions.

38. The flexible radome cover of claim 36, further comprising a protective film.

39. The radome cover of claim 36, wherein the flexible radome cover has a trapezoidal tear strength of at least about 400 pounds in at least four directions.

40. The radome of claim 36, wherein the multiaxial material has structural yarns at even intervals.

41. The radome of claim 36, wherein,
the first non-orthogonal orientation comprises a skew angle of about 40 degrees to about 50 degrees;
the second non-orthogonal orientation comprises a skew angle of about 40 degrees to about 50.

42. The radome of claim 36, wherein,
the first non-orthogonal orientation comprises a skew angle of about 60 degrees; and
the second non-orthogonal orientation comprises a skew angle of about 60 degrees.

43. A radome, comprising:
a first woven ply comprising a first non-orthogonal orientation, the first woven ply being individually stabilized by a first-stabilizing agent,
the first stabilizing agent comprising an agent selected from a group consisting of silicone rubber, urethane rubber, urethane, polyurethane, polyvinyl chloride, polyvinylidene chloride, polyvinyl alcohol, and their copolymers with acrylic acid or acrylic acid esters or other vinyl ester monomers, fluoropolymers, fluoroelastomers, and combinations thereof;
the first woven ply comprising yarns comprising fibers selected from a group consisting of aramids, fiberglass, polyester, and combinations thereof;
the first non-orthogonal orientation being a positive non-orthogonal orientation and having a skew angle of about 60 degrees;
a second woven ply comprising a second non-orthogonal orientation the second woven ply being individually stabilized by a stabilizing agent;
the second stabilizing agent comprising an agent selected from a group consisting of silicone rubber, urethane rubber, urethane, polyurethane, polyvinyl chloride, polyvinylidene chloride, polyvinyl alcohol, and their copolymers with acrylic acid or acrylic acid esters or other vinyl ester monomers, fluoropolymers, fluoroelastomers, and combinations thereof;

the second woven ply comprising yarns comprising fibers selected from a group consisting of aramids, fiberglass, polyester, and combinations thereof;

the second non-orthogonal orientation being a negative non-orthogonal orientation and having a skew angle of about 60 degrees;

a third ply having an orthogonal orientation;

wherein the radome is a flexible, air-supported radome;

wherein the first woven ply and second woven ply are part of a multi-axial material, the multi-axial material having a thickness of up to about 0.3 inches; and wherein the radome contributes to a signal loss of no more than about 0.5% of a signal strength at least one frequency used by radars.

* * * * *

UNITED STATES PATENT AND TRADEMARK OFFICE
CERTIFICATE OF CORRECTION

PATENT NO. : 7,153,792 B2
APPLICATION NO. : 10/834787
DATED : December 26, 2006
INVENTOR(S) : Katherine M. Sahlin and Michael P. Cushman It is certified that error appears in the above-identified patent and that said Letters Patent is hereby corrected as shown below:

Column 30:
line 8, replace ":" with --;--.
line 16, insert --,-- after "orientation".
line 17, insert --,-- after "orientation".

Column 32:
line 33, insert --degrees-- after "50".
line 43, replace "first-stabilizing" with --first stabilizing--.
line 59, insert --,-- after "orientation".

Signed and Sealed this

Twentieth Day of March, 2007

JON W. DUDAS
*Director of the United States Patent and Trademark Office*